(12) United States Patent
Lee et al.

(10) Patent No.: US 7,263,509 B2
(45) Date of Patent: Aug. 28, 2007

(54) INTELLIGENT SPATIAL REASONING

(76) Inventors: Shih-Jong J. Lee, 15418 SE. 53rd Pl., Bellevue, WA (US) 98006; Seho Oh, 5025 145th Pl. SE., Bellevue, WA (US) 98006

( * ) Notice: Subject to any disclaimer, the term of this patent is extended or adjusted under 35 U.S.C. 154(b) by 840 days.

(21) Appl. No.: 10/411,437

(22) Filed: Apr. 9, 2003

(65) Prior Publication Data

US 2004/0205038 A1 Oct. 14, 2004

(51) Int. Cl.
- *G06F 12/00* (2006.01)
- *G06N 5/02* (2006.01)

(52) U.S. Cl. .............................. 706/47; 706/19; 706/14

(58) Field of Classification Search ................. 706/47, 706/19, 14; 700/259
See application file for complete search history.

(56) References Cited

U.S. PATENT DOCUMENTS

| | | | | |
|---|---|---|---|---|
| 4,852,018 | A * | 7/1989 | Grossberg et al. | 700/259 |
| 5,359,712 | A * | 10/1994 | Cohen et al. | 715/723 |
| 6,912,515 | B2 * | 6/2005 | Jackson et al. | 706/19 |
| 2004/0128081 | A1 * | 7/2004 | Rabitz et al. | 702/23 |
| 2004/0193707 | A1 * | 9/2004 | Alam et al. | 709/223 |

OTHER PUBLICATIONS

Kuu-young Young et al, Learning Control for Similar Robot Motions, May 1995, IEEE, INSPEC 5094279, 2168-2174.*

Lee, JSJ, Haralick, RM and Shapiro, LG, "Morphologic Edge Detection," IEEE Trans. Robotics and Automation RA3(2):142-56, 1987.

Haralick RM and Shapiro, LG, "Survey Image Segmentation Techniques," Comput. Vision, Graphics Image Processing, vol. 29: 100-132, 1985.

Haralick, RM, Shapiro, RG, "Computer and Robot Vision", vol. II, pp. 440-453, Addison Wesley, 1993.

Platani M., Goldberg I., Lamond A., Swedlow S. "Cajal body dynamics and association with chromatin are ATP-dependent". Nature Cell Biology. Jul. 2002; 4:502-508.

Rosenfeld A., Kak, AC., "Digital Picture Processing," Academic Press, 1976, pp. 356-357.

Haralick, RM, Shapiro, RG, "Computer and Robot Vision", vol. II, pp. 28-48, Addison Wesley, 1993.

(Continued)

*Primary Examiner*—Joseph P Hirl

(57) ABSTRACT

An intelligent spatial reasoning method receives a plurality of object sets. A spatial mapping feature learning method uses the plurality of object sets to create at least one salient spatial mapping feature output. It performs spatial reasoning rule learning using the at least one spatial mapping feature to create at least one spatial reasoning rule output. The spatial mapping feature learning method performs a spatial mapping feature set generation step followed by a feature learning step. The spatial mapping feature set is generated by repeated application of spatial correlation between two object sets. The feature learning method consists of a feature selection step and a feature transformation step and the spatial reasoning rule learning method uses the supervised learning method.

The spatial reasoning approach of this invention automatically characterizes spatial relations of multiple sets of objects by comprehensive collections of spatial mapping features. Some of the features have clearly understandable physical, structural, or geometrical meanings. Others are statistical characterizations, which may not have clear physical, structural or geometrical meanings when considered individually. A combination of these features, however, could characterize subtle physical, structural or geometrical conditions under practical situations. One key advantage of this invention is the ability to characterize subtle differences numerically using a comprehensive feature set.

33 Claims, 5 Drawing Sheets

OTHER PUBLICATIONS

Serra, J, "Image analysis and mathematical morphology," London: Academic Press, 1982, pp. 381-387.

Hall, M. A. "Correlation-based feature selection for discrete and numeric class machine learning." Proceedings of the Seventeenth International Conference on Machine Learning, Stanford University, CA. Morgan Kaufmann Publishers, 2000 Devijver and Kittler, Pattern Recognition: A Statistical Approach, PHI, NJ, 1982 pp. 212-219.

Breiman L., Friedman J. H., Olshen R. A. and Stone C. J., "Classification And Regression Trees", Chapman &Hall/CRC, 1984, pp. 18-58

Quinlan J. R., "C4.5 Programs For Machine Learning", Morgan Kaufmann, 1993, pp. 17-26.

Schapire, RE, "The boosting approach to machine learning: An overview." In MSRI Workshop on Nonlinear Estimation and Classification, 2002.

Dietterich, T. G. "Ensemble Methods in Machine Learning." In J. Kittler and F. Roli (Ed.) First International Workshop on Multiple Classifier Systems, Lecture Notes in Computer Science (pp. 1-15) New York: Springer Verlag, 2000 Kuipers, Benjamin, "The Spatial Semantic Hierarchy", Artificial Intelligence 119(2000) pp. 191-233.

* cited by examiner

| | | Condition Object Set (C) | | | | |
|---|---|---|---|---|---|---|
| | | No Operation | Inner distance transformed | Outer distance transformed | Connected component labeled | Zone of influence labeled |
| Target Object Set (T) | No Operation | | Intersect proportion | | | |
| | Inner distance transformed | Overlap T distance statistics | Overlap C distance statistics | Outside C distance statistics | Overlapped C component statistics | C ZOI component distribution statistics |
| | Outer distance transformed | Outside T distance statistics | Overlap C and T distance correlation | Outside C and T distance correlation | Overlapped C component distance variations | Overlapped ZOI distance variations |
| | Connected component labeled | Overlapped T component statistics | Outside T and C distance correlation | Outside C and outside T distance correlation | C component Outside T distance variations | C ZOI Outside T distance variations |
| | Zone of influence labeled | T ZOI component distribution statistics | Overlapped T component distance variations | T component Outside C distance variations | Overlapped C component variations | C ZOI component distribution variations |
| | | | T ZOI component C distance variations | T ZOI Outside C distance variations | T ZOI component distribution variations | Overlapped T ZOI component variations |

Figure 7

INTELLIGENT SPATIAL REASONING

TECHNICAL FIELD

This invention relates to a method for intelligent spatial reasoning of multiple sets of objects in multidimensional space.

BACKGROUND OF THE INVENTION

Spatial reasoning is commonly known as reasoning about shape, measurement, depiction and navigation. Shape relates to the structure of space. Measurement relates to the dimension of space. Depiction relates to the representation of space entities. Navigation relates to large-scale space and concepts such as position, direction, distance, and routes. Spatial reasoning creates representation and applies rules that could describe the relations or changes in the relations of shape, measurement, depiction and navigation.

Humans develop spatial reasoning capability by first developing spatial representation then integrating multiple representations by their associated relations and rules. Similarly, spatial reasoning by computer involves the development of models for representation of spatial entities and the inference of information about spatial relations within the model framework. Spatial knowledge could be stored in a human cognitive map like representation such as the Spatial Semantic Hierarchy (B. Kuipers. 2000. *The Spatial Semantic Hierarchy. Artificial Intelligence* 119: 191-233.) The prevailing goal of a computerized spatial reasoning method is to discover meaningful cues and premises from the spatial relations of multiple sets of objects residing in multidimensional space.

There are many practical applications for spatial reasoning. For example, spatial reasoning is critical to the Geographical Information Systems (GIS). GIS is a computer system capable of assembling, storing, manipulating, and displaying geographically referenced information, i.e. data identified according to its location. It can be used for scientific investigations, resource management, and development planning. (Geographical Information Systems http://www.usgs.gov/research/gis/title.html)

In a cell image informatics application, spatial reasoning relates the target segmentation to specific structures and objects identified by morphology processing. For example in a Cajal Bodies (CB) dynamics study (Platani M., Goldberg I., Lamond A., Swedlow S. "Cajal body dynamics and association with chromatin are ATP-dependent". *Nature Cell Biology*. 2002 July; 4: 502-508), CBs identified in the target processing can be spatially related to the chromatin structures identified in the morphology processing. In semiconductor or electronic automatic defect classification or military automatic target classification applications, spatial reasoning relates the spatial relations among the components of defect arrangements or target structures to arrive at a classification decision.

In practical applications involving spatial decisions, it is highly desirable to have an automatic method to extract spatial reasoning features and generate spatial reasoning rules that could distinguish subtle differences and can compensate for measurement imperfection, noise, and uncertainty.

Prior art approaches use symbolic representations such as wire frame, surface-edge-vertex, generalized cylinder, superquadric, octree, etc. for spatial entity representations (Haralick, R M, Shapiro, R G, "Computer and Robot Vision", Vol. II, PP440-453, Addison Wesley, 1993). Relational distance based matching is often used for spatial reasoning based on symbolic representations. This class of methods suffers from the non-numerical nature of the representation and data processing where it is difficult to handle uncertainty and noise from data and measurements. Furthermore, it is difficult to automatically generate spatial mapping features and automatically generate or discover spatial mapping rules corresponding to events or targets of interest. Therefore, spatial reasoning rules are often defined by human heuristics. Human defined rules are primitive, i.e. non-robust. They are incapable of distinguishing subtle differences; neither can they compensate for imperfect measurements.

OBJECTS AND ADVANTAGES

The primary object of intelligent spatial reasoning is to automatically discover meaningful cues and premises from the spatial relations of multiple sets of objects residing in multidimensional space. A further object of this invention is to create spatial reasoning rules that are robust to practical situations and real life variation. A still further object of the invention is to automatically generate salient spatial mapping features to characterize the spatial situations of interest. A further object of the invention is to automatically generate spatial reasoning rules to identify and represent spatial situations of interest.

The spatial reasoning approach of the invention automatically characterizes spatial relations of multiple sets of objects by comprehensive collections of spatial mapping features. Some of the features have clearly understandable physical, structural, or geometrical meanings. Others are statistical characterizations, which may not have clear physical, structural or geometrical meanings when considered individually. A combination of these features, however, could characterize subtle physical, structural or geometrical conditions under practical situations. One key advantage of the invention is the ability to characterize subtle differences numerically using a comprehensive feature set.

Comprehensive numerical characterization facilitates the effectiveness of the follow on feature learning stage to automatically select salient features among the comprehensive collection of features. The feature learning process optimizes the discrimination power of features by feature selection, feature combination or feature transformation. Since the features are derived from measured data that include all imperfection, noise, variations, and measurement errors, the feature learning process embraces all non-ideal yet practical situations and the learned features are robust to real life variations.

After the feature learning method of this invention automatically selects salient features, spatial reasoning rules are automatically generated by decision learning methods. The spatial reasoning rule learning stage generates rules that include a combination of the salient features to arrive at physical, structural, or geometrical conditions that are strongly related to the events/outcomes/classification of interest. The spatial reasoning rules can be presented to a human for confirmation and adjustment if needed. The resulting spatial reasoning rules can be applied to new data for automatic decision making from spatial relations. That is, the resulting spatial reasoning rules can be used to perform automatic spatial reasoning on volume data or new experiments.

SUMMARY OF THE INVENTION

An intelligent spatial reasoning method receives a plurality of object sets. A spatial mapping feature learning method uses the plurality of object sets to create at least one salient spatial mapping feature output. It performs spatial reasoning rule learning using the at least one spatial mapping feature to create at least one spatial reasoning rule output. The spatial mapping feature learning method performs a spatial mapping feature set generation step followed by a feature learning step. The spatial mapping feature set is generated by repeated application of spatial correlation between two object sets. The feature learning method consists of a feature selection step and a feature transformation step and the spatial reasoning rule learning method uses the supervised learning method.

BRIEF DESCRIPTION OF THE DRAWINGS

The preferred embodiment and other aspects of the invention will become apparent from the following detailed description of the invention when read in conjunction with the accompanying drawings which are provided for the purpose of describing embodiments of the invention and not for limiting same, in which:

FIG. 7 lists the feature collections and the primary information they extract;

DETAILED DESCRIPTION OF THE INVENTION

I. Intelligent Spatial Reasoning Process Overview

Figure 1:
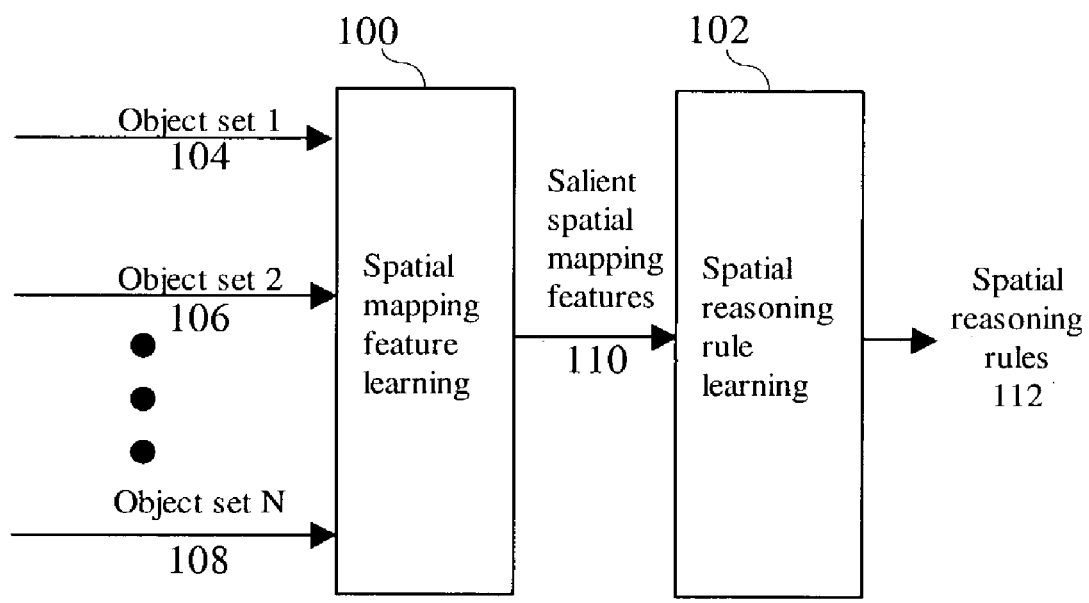
FIG. 1 shows the overall processing flow for the spatial reasoning method.

The overall processing flow of the spatial reasoning process is shown in FIG. 1. A plurality of object sets 104, 106, . . . , 108 is processed by a spatial mapping feature learning step 100. This step generates a set of salient spatial mapping features 110 that are processed by the follow on spatial reasoning rule learning step 102. The spatial reasoning rule learning step automatically creates spatial reasoning rules 112 that characterize the spatial situations of interest among the plurality of object sets 104, 106, . . . , 108.

II. Spatial Mapping Feature Learning

Figure 2:
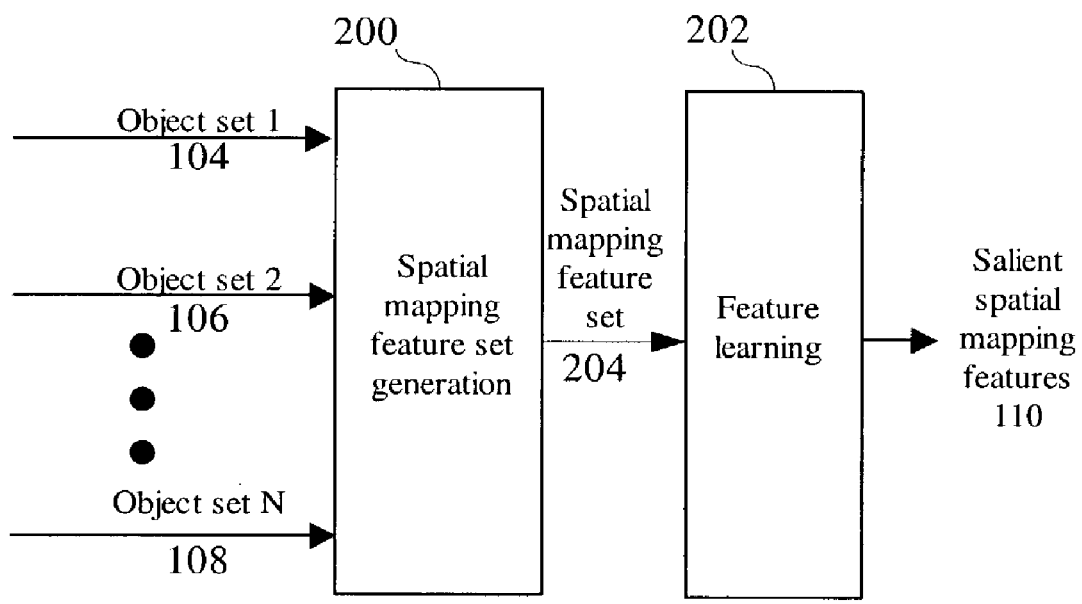
FIG. 2 shows the processing flow for the spatial mapping feature learning method.

The spatial mapping feature learning step generates a comprehensive set of spatial mapping features. The features are subject to a feature learning process to transform and select a set of salient spatial mapping features for follow-on processing. This is shown in FIG. 2. A spatial mapping feature set generation method 200 uses the plurality of object sets 104, 106, . . . , 108 to create a spatial mapping feature set 204 that includes a plurality of features. The spatial mapping feature set 204 is processed by a feature learning step 202 to create at least one salient spatial mapping feature 110.

II.1 Spatial Mapping Feature Set Generation

The spatial mapping feature set is generated by repeated application of spatial correlation between two object sets. We first describe the procedure of spatial mapping feature generation between two object sets: object set 1 and object set 2.

The rationale behind the spatial mapping feature set generation is to create a comprehensive characterization of all possible spatial relations between the object sets. The comprehensive feature set facilitates the effectiveness of the follow-on feature learning stage to select salient features from the set. In addition, a spatial reasoning rule learning stage generates rules that use the combination of salient features and decision criteria to arrive at physical, structural, geometrical, or other conditions that may be related to the events/conditions/classifications of interest underlying the object sets.

II.1.1 Spatial Mapping Features Between Two Object Sets

In one embodiment of the invention, binary masks in a multidimensional image space represent each object set. The pixels belonging to the object set are labeled "1", otherwise the pixels are labeled "0". To generate the spatial mapping features by object set correlation, one of the object sets is designated as the target object set and the other object set is designated as the condition object set.

Figure 3:
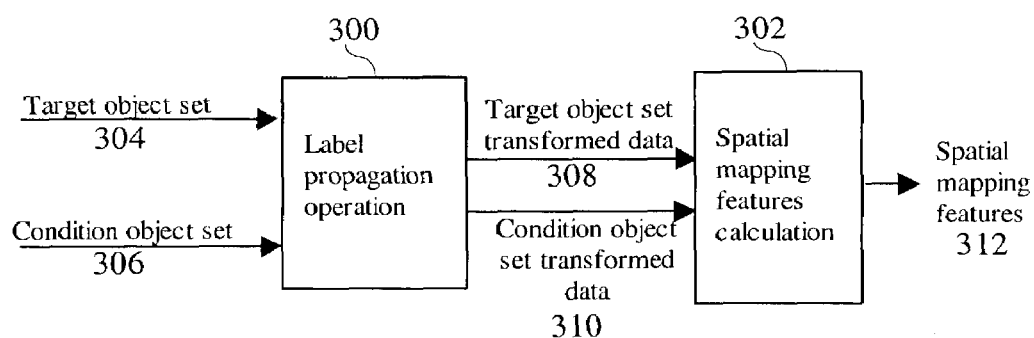
FIG. 3 shows the processing flow for the spatial mapping features generation method for a target object set and a condition object set.

Each object set is subject to transformation by several label propagation operations. Spatial mapping features for the target object set are calculated from the transformed images of the target object set and the condition object set. The target and condition object set designation can be reversed to derive another set of spatial mapping features. This would enrich the spatial characterization power of the spatial mapping features. The processing flow for the spatial mapping features generation method for a target object set and a condition object set is shown in FIG. 3. The spatial mapping feature generation method inputs a target object set 304 and a condition object set 306. It performs label propagation operation 300 on the target object set 304 and the condition object set 306 to create target object set transformed data 308 and condition object set transformed data 310 outputs. It then performs spatial mapping features calculation 302 using the target object set transformed data 308 and the condition object set transformed data 310. This results in a spatial mapping features output 312.

II.1.1.1 Label Propagation Operations

In one embodiment of the invention, 5 operations are applied: no operation, inner distance transformation, outer distance transformation, connected component labeling, zone of influence labeling.

Without loss of generality, we explain the operations for 2 object sets in two-dimensional images. The method can be directly generalized to multidimensional images. Other dimensions could include color, time, momentum, intensity, etc.

A. No Operation

Figure 4A:
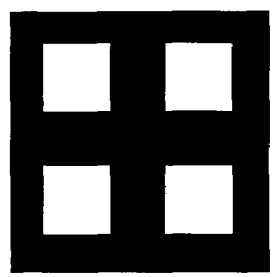
FIG. 4A shows an example image of an object set with 4 squares.

In this case, the input binary image is used directly without any additional operation. The input binary image has a single label for each pixel belonging to the object set. FIG. 4A shows an example image whose object set includes 4 squares. The pixels belonging to the object set are labeled "255" (brightest regions).

B. Inner Distance Transformation

Figure 4B:
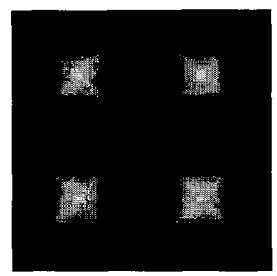
FIG. 4B shows the 8-connected inner distance transformed image for the image of FIG. 4A.

Inner distance transformation creates a distance image that assigns the shortest distance from each of the object pixels to a background pixel. In a two dimensional image, the distance transformation can be performed efficiently by a two-pass algorithm. The first pass scans the image line by line from upper left corner toward bottom right corner and the second pass reverses the scanning from bottom right corner toward upper left corner. It uses a dynamic programming like optimization algorithm. (Rosenfeld A., Kak, A C., "Digital Picture Processing," Academic Press, 1976, pp.356-357) The algorithm can be directly generalized to multidimensional images. FIG. 4B shows the inner distance transformed image of FIG. 4A where brighter pixels have higher distance values.

C. Outer Distance Transformation

Figure 4C:
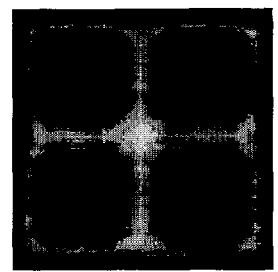
FIG. 4C shows the 4-connected outer distance transformed image for the image of FIG. 4A.

Outer distance transformation creates a distance image that assigns the shortest distance from each of the background pixels to an object pixel. This can be achieved by applying the distance transformation on the background rather than the object regions. FIG. 4C shows the outer distance transformed image of FIG. 4A.

D. Connected Component Labeling

Figure 4D:
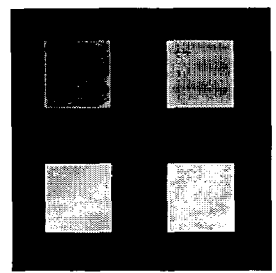
FIG. 4D shows the connected component labeled image for the image of FIG. 4A.

A connected component labeling operation groups object pixels into connected components. Each object pixel is given a label corresponding to its connected component number. The object set shown in FIG. 4A has four connected components, one per square region. FIG. 4D shows a connected component labeled image of FIG. 4A where different labels are illustrated by different brightness. In one embodiment of the invention, the connected component labeling is performed by a two-pass algorithm (Haralick, R M, Shapiro, R G, "Computer and Robot Vision", Vol. I, PP28-48, Addison Wesley, 1992) that can be directly generalized to multidimensional images.

E. Zone of Influence Labeling

Figure 4E:
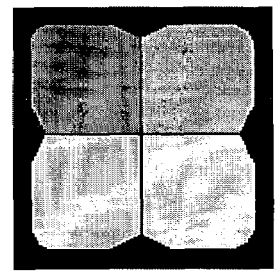
FIG. 4E shows the zone of influence labeled image for the image of FIG. 4A.

A zone of influence operation assigns each pixel of the image a unique label corresponding to the connected component to which it is closest (influenced). It can be determined by first finding the ridge lines (medial axis) from the outer distance transformed image (Serra, J, "Image analysis and mathematical morphology," London: Academic Press, 1982, pp. 381-387) and performing connected component labeling of the non-ridge lines. FIG. 4E shows the zone of influence labeled image of FIG. 4A. In this image the image border is also considered a connected component.

FIG. 5 shows another example image whose object set includes a single circle region. The pixels belonging to the object set are labeled "255" (brightest regions) as shown in FIG. 5A. The inner distance transformed image (using 8-connected distance) is shown in FIG. 5B. The outer distance transformed image (using 4-connected distance) is shown in FIG. 5C. The connected component labeled image is shown in FIG. 5D and the zone of influence labeled image is shown in FIG. 5E.

The label propagation operations are applied to both the target and the condition object set. This creates target object set transformed data and condition object set transformed data. The data are used to perform a spatial mapping features calculation.

Figure 6A:
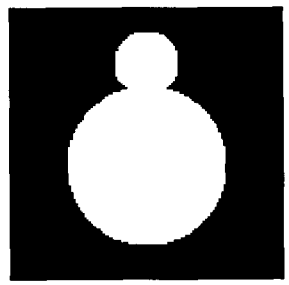
FIG. 6A shows an example image of an object set with one non-convex region formed by two touching circles.
Figure 6B:
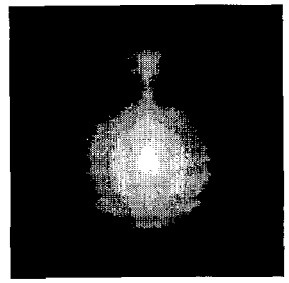
FIG. 6B shows inner distance transformed image for the image of FIG. 6A.
Figure 6C:
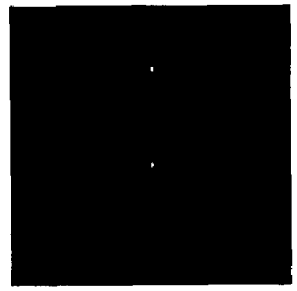
FIG. 6C shows local centers for the image of FIG. 6A.
Figure 6D:
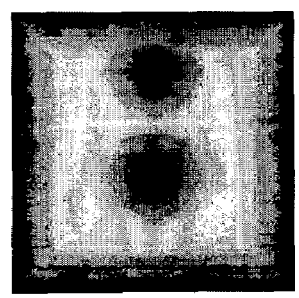
FIG. 6D shows local center distance transformed image for the image of FIG. 6A.

Those to create ordinary skill in the art should recognize that other label propagation operations or spatial transformations could be used and they are within the scope of this invention. An alternative transformation example is shown in FIG. 6D. FIG. 6A shows an example image of an object set with one non-convex region formed by two touching circles. FIG. 6B shows the inner distance transformed image for the image of FIG. 6A. FIG. 6C shows local centers for the image of FIG. 6A. Where local centers are the centers of local convex components of the object. They can be detected as the peaks in the inner distance transformed image. FIG. 6D shows the local center distance transformed image for the image of FIG. 6A.

II.1.1.2 Spatial Mapping Features Calculation

In one embodiment of the invention, there are up to 25 collections of features in the comprehensive spatial mapping feature set. The feature collections and the primary information extracted are listed in FIG. 7.

Information from multiple aspects is extracted by the 25 collections of spatial mapping features. The definitions of the spatial mapping features are listed in section IV. The previous section describes the spatial mapping feature set between two object sets when one of them is designated as the target object set. The designation of the target object set and the condition object set can be reversed and the spatial mapping features recalculated even though some of the features would have already been extracted regardless of the target and condition object set designation. Some additional features can be derived by designation reversal for feature learning.

Those having ordinary skill in the art should recognize that other forms of spatial mapping feature calculations could be used and they are within the scope of the invention.

II.1.2 Spatial Mapping Features Between Multiple Object Sets

Figure 8:
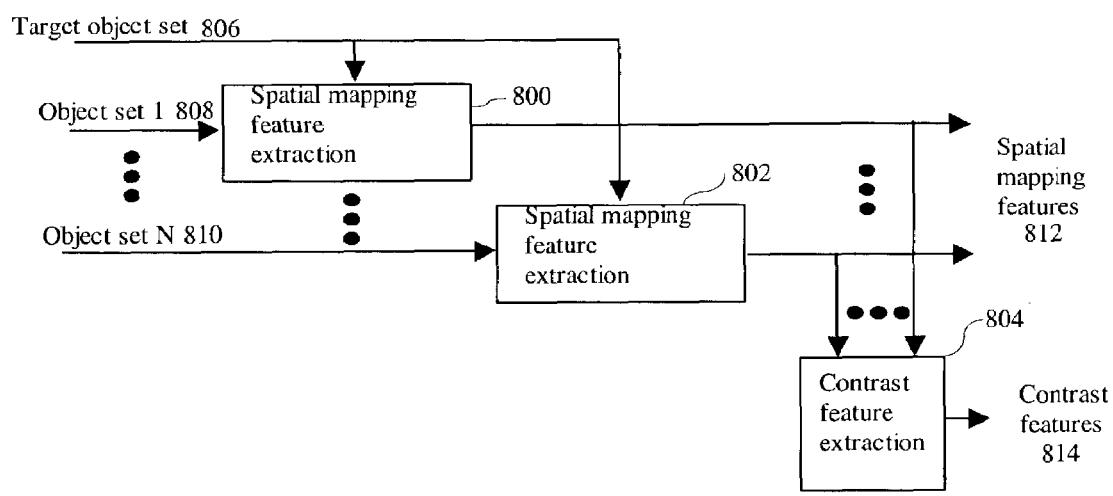
FIG. 8 shows the processing flow for spatial mapping feature generalization for multiple object sets.

The spatial mapping feature calculations for two object sets could be generalized to include multiple object sets. In one embodiment of the invention, the generalization method is shown in FIG. 8. The target object set 806 is paired with each of the other object sets 808, 810 one by one and the spatial mapping features 812 of each object set pair are extracted using the spatial mapping feature extraction method 800, 802 as described in the previous section. Multiple feature sets created from two object set pairs could be further processed to create higher order contrast features 814. The contrast features 814 can be extracted by the contrast feature extraction method 804 from each dual of the object set pairs.

Contrast features can be derived for each of the spatial mapping features. Assuming spatial mapping feature i is derived from the target object set and the object set 1 (Feature $_i^{T\_O1}$) and is also derived from the target object set and the object set 2 (Feature $_i^{T\_O2}$). The contrast feature i for the (target, object set 1) and (target, object set 2) dual can be derived as:

Feature difference: $F1_i^{T\_O1-T\_O2} = \text{Feature}_i^{T\_O1} - \text{Feature}_i^{T\_O2}$, Absolute feature difference: $F2_i^{T\_O1-T\_O2} = |\text{Feature}_i^{T\_O1} - \text{Feature}_i^{T\_O2}|$, First feature proportion: $F3_i^{T\_O1-T\_O2} = \text{Feature}_i^{T\_O1}/(\text{Feature}_i^{T\_O1} + \text{Feature}_i^{T\_O2})$, Second feature proportion: $F4_i^{T\_O1-T\_O2} = \text{Feature}_i^{T\_O2}/(\text{Feature}_i^{T\_O1} + \text{Feature}_i^{T\_O2})$, or Absolute difference proportion: $F5_i^{T\_O1-T\_O2} = |\text{Feature}_i^{T\_O1} - \text{Feature}_i^{T\_O2}|/(\text{Feature}_i^{T\_O1} + \text{Feature}_i^{T\_O2})$.

Those having ordinary skill in the art should recognize that other forms of contrast feature calculation rules could be used and they are within the scope of the invention.

In another embodiment of the invention, the generalization method uses the two object set feature calculation method. For a selected target object set and multiple condition object sets, it simply takes the union of all condition object sets as one condition object set to derive the spatial mapping features between multiple object sets.

In the above feature calculation, we assume the target object set is pre-assigned. When the target object set can be flexibly assigned, the object sets can take turns to become the target object set and the features calculated accordingly. In this way, additional features are created.

Those having ordinary skill in the art should recognize that other forms of object set combinations could be used and they are within the scope of the invention.

II.2 Feature Learning

After spatial mapping features are extracted, the events associated with the feature sets are determined. Practical examples of the events include "disease vs. non-disease", "treatment vs. non-treatment", defect types, target models, etc. The events are used as the labels for the spatial mapping features. Multiple labeled feature vectors can be used for feature learning. Feature learning includes feature selection and feature transformation.

II.2.1 Feature Selection

Feature selection selects a subset of features that could discriminate between pixels of different classes (labels). Feature selection reduces the dimensionality of the data to be processed by the classifier, reducing execution time and improving predictive accuracy.

In one embodiment of the invention, the CFS (Correlation-based Feature Selection) method (Hall, M. A. "Correlation-based feature selection for discrete and numeric class machine learning." Proceedings of the Seventeenth International Conference on Machine Learning, Stanford University, Calif. Morgan Kaufmann Publishers, 2000) is used for feature selection. The CFS algorithm is based on the following hypothesis:

A good feature subset is one that contains features highly correlated with (predictive of) the class, yet uncorrelated with (not predictive of) each other. Other feature selection methods such as the branch and bound method, sequential forward selection method, or sequential backward selection method could also be used. (see "Devijver and Kittler, Pattern Recognition: A Statistical Approach", PHI, NJ, 1982 PP. 212-219.")

II.2.2 Feature Transformation

Feature transformation transforms the original feature set into a subset of derived features. The classifier can then be run on this derived set of features. Examples include principal components analysis, factor analysis and independent components analysis. Such techniques could result in reasonable classification performance.

In one embodiment of the invention, the principal components analysis method is used for feature transformation. It is a dimensionality reduction technique in which d-dimensional data vectors are mapped onto vectors in a new M-dimensional space, where M<d. To do this, the mean and covariance matrix of the data are calculated, and the best M dimensional linear representation of the data is formed by the mean plus the projection of the data onto the eigenvectors of the covariance matrix corresponding to the M largest eigenvalues.

Those having ordinary skill in the art should recognize that other feature transformation methods could be used and they are all within the scope of this invention.

III. Spatial Reasoning Rule Learning

After Spatial mapping feature learning, discriminate spatial mapping features are derived. The discriminate features are used to perform spatial reasoning decision learning. In one embodiment of the invention, decision learning is achieved by a supervised learning method. It creates a classifier that assigns each target object set to one of the events.

A number of different supervised learning methods can be used such as: decision tree, neural networks, K-nearest neighbor classifier, kernel-based classifier (such as Parzen windows), finite mixture models, Fisher's linear, Bayes quadratic, etc.

In one embodiment of the invention, a decision tree classifier is used for decision learning. Decision trees represent a learned function for classification of discrete-valued target functions. Decision trees classify novel items by traversing the tree from the root down to a leaf node, which assigns a classification to the item (Breiman L., Friedman J. H., Olshen R. A. and Stone C. J., "Classification And Regression Trees", Chapman &Hall/CRC, 1984, PP.18-58; Quinlan J. R., "C4.5 Programs For Machine Learning", Morgan Kaufmann, 1993, PP.17-26; U.S. patent application Ser. No. 09/972,057 entitled, "Regulation of Hierarchic Decisions in Intelligent Systems"; U.S. patent application Ser. No. 10/081,441 entitled, "Information Integration Method for Decision Regulation in Hierarchic Decision Systems).

In a challenging classification situation, boosting and bagging schemes can be used to enhance the results of the decision tree classifier. However, this will result in more computationally expensive decision classifiers.

Boosting (See "Robert E. Schapire, *The boosting approach to machine learning: An overview*. In MSRI Workshop on Nonlinear Estimation and Classification, 2002.") is applied to improve the decision algorithm's accuracy. Boosting works by repeatedly invoking a weak learner (a learning algorithm for which the training set error rate is only slightly better than that of random guessing) on a set of training samples, over which a distribution is maintained. This distribution starts off as a uniform distribution, but is adapted so that on each iteration the weight given to incorrectly classified training examples increases. As such, the weak learner must give greater emphasis to the hard samples in the training set.

Bagging (bootstrap aggregation) (Dietterich, T. G., "*Ensemble Methods in Machine Learning*." In J. Kittler and F. Roli (Ed.) First International Workshop on Multiple Classifier Systems, Lecture Notes in Computer Science New York: Springer Verlag., 2000, PP. 1-15) is a very simple method of manipulating the training data set. A bootstrap sample is generated by uniformly sampling m instances from the training set with replacement. A classifier is then built from the bootstrap sample. This process is repeated several times, and the final classifier is constructed by taking a majority vote of the classifiers built using the bootstrap replicates.

Those having ordinary skill in the art should recognize that other pattern recognition and classification methods could be used and that they are within the scope of this invention.

IV. Spatial Mapping Features Calculation

Spatial mapping features for the target object set can be calculated from the transformed images of the target object set and the condition object set. In one embodiment of the invention, five groups of features are calculated. Each group corresponds to one transformation of the target object set. Therefore, there are features of: no operation group, inner distance transformation group, outer distance transformation group, connected component labeling group, and zone of influence labeling group.

A. No operation group spatial mapping feature calculation

This group maps the spatial relation of the no operation data of the target object set and the five transformed data of the condition object set.

(i) No operation target data and no operation condition data

Figure 5A:
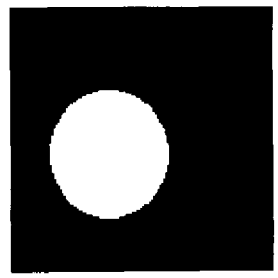
FIG. 5A shows an example image of an object set with one circle region.
Figure 5B:
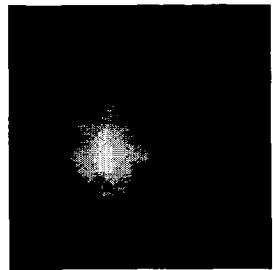
FIG. 5B shows the 8-connected inner distance transformed image for the image of FIG. 5A.
Figure 5C:
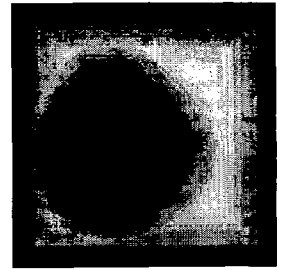
FIG. 5C shows the 4-connected outer distance transformed image for the image of FIG. 5A.
Figure 5D:
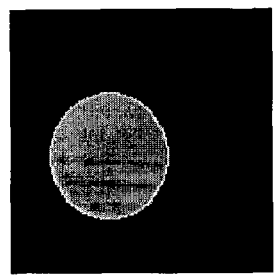
FIG. 5D shows the connected component labeled image for the image of FIG. 5A.
Figure 5E:
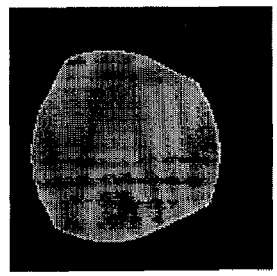
FIG. 5E shows the zone of influence labeled image for the image of FIG. 5A.
Figure 9A:
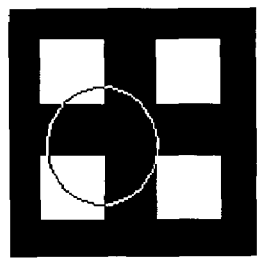
FIG. 9A shows the boundary of the object set of FIG. 5A (as no operation target object set) overlaid on the image of FIG. 4A (as no operation condition object set). This illustrates the underlying spatial relation between the no operation target object set and the no operation condition object set.

This collection defines the spatial mapping features associated with no operation target data and no operation condition data. If the object set in FIG. 5A is the target object set and the object set in FIG. 4A is the condition object set, the spatial relation underlying this collection is shown in FIG. 9A where the boundary of the no operation target object set is overlaid on the no operation condition object set. In one embodiment of the invention, the corresponding feature collection is defined as follows:

1. Condition ratio: P(Condition/Target), the probability of condition object set included in the target object set. This can be calculated by Area(Condition ∩ Target)/Area(Target). Where ∩ designates set intersection and Area(s) designates the area of a set s.
2. Intersection ratio: Area(Condition ∩ Target)/Area(Condition ∪ Target). Where ∪ designates set union.

Those having ordinary skill in the art should recognize that additional mapping functions could be defined for mapping between no operation target data and no operation condition data that is within the scope of this invention.

(ii) No operation target data and inner distance transformed condition data

Figure 9B:
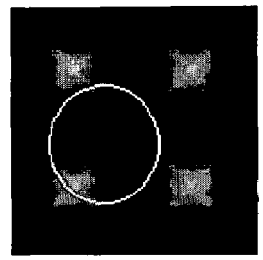
FIG. 9B shows the boundary of the object set of FIG. 5A (as no operation target object set) overlaid on the image of FIG. 4B (as inner distance transformed condition object set). This illustrates the underlying spatial relation between the no operation target object set and the inner distance transformed condition object set.

This collection defines the spatial mapping features associated with no operation target data and inner distance transformed condition data. If the object set in FIG. 5A is the target object set and the object set in FIG. 4A is the condition object set, the spatial relation underlying this collection is shown in FIG. 9B where the boundary of the no operation target object set is overlaid on the inner distance transformed condition object set. In one embodiment of the invention, the corresponding feature collection is defined as follows:

1. Inner distance mean: mean of the inner distance values of the intersection pixels: (Condition ∩ Target). This indicates overlap between the two sets.
2. Inner distance standard deviation: standard deviation of the inner distance values of the intersection pixels: (Condition ∩ Target).
3. Normalized inner distance mean: inner distance mean divided by the mean inner distance value of the Condition object set.
4. Normalized inner distance standard deviation: inner distance standard deviation divided by the mean inner distance value of the Condition object set.
5. Inner distance skewness: skewness of the inner distance values of the intersection pixels: (Condition ∩ Target). Skewness is a dimensionless value.
6. Inner distance kurtosis: kurtosis of the inner distance values of the intersection pixels: (Condition ∩ Target). Kurtosis is also a dimensionless value.

Those having ordinary skill in the art should recognize that additional mapping functions could be defined for the mapping between no operation target data and inner distance transformed condition data that are within the scope of this invention.

(iii) No operation target data and outer distance transformed condition data

Figure 9C:
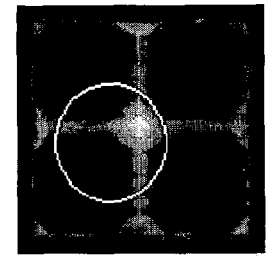
FIG. 9C shows the boundary of the object set of FIG. 5A (as no operation target object set) overlaid on the image of FIG. 4C (as outer distance transformed condition object set). This illustrates the underlying spatial relation between the no operation target object set and the outer distance transformed condition object set.

This collection defines the spatial mapping features associated with no operation target data and outer distance transformed condition data. If the object set in FIG. 5A is the target object set and the object set in FIG. 4A is the condition object set, the spatial relation underlying this collection is shown in FIG. 9C where the boundary of the no operation target object set is overlaid on the outer distance transformed condition object set. In one embodiment of the invention, the corresponding feature collection is defined as follows:

1. Outer distance mean: mean of the outer distance values of the non-intersecting Target pixels: Target—(Condition ∩ Target).

2. Outer distance standard deviation: standard deviation of the outer distance values of the non-intersecting Target pixels: Target—(Condition ∩ Target).
3. Normalized outer distance mean: Outer distance mean divided by the mean outer distance of the Condition object set.
4. Normalized outer distance standard deviation: Outer distance standard deviation divided by the mean outer distance of the Condition object set.
5. Outer distance skewness: skewness of the non-intersecting Target pixels: Target—(Condition ∩ Target).
6. Outer distance kurtosis: kurtosis of the non-intersecting Target pixels: Target—(Condition ∩ Target).

Those having ordinary skill in the art should recognize that additional mapping functions could be defined for mapping between no operation target data and outer distance transformed condition data that are within the scope of this invention.

(iv) No operation target data and connected component labeled condition data

Figure 9D:
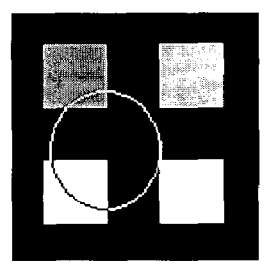
FIG. 9D shows the boundary of the object set of FIG. 5A (as no operation target object set) overlaid on the image of FIG. 4D (as connected component labeled condition object set). This illustrates the underlying spatial relation between the no operation target object set and the connected component labeled condition object set.

This collection defines the spatial mapping features associated with no operation target data and connected component labeled condition data. If the object set in FIG. 5A is the target object set and the object set in FIG. 4A is the condition object set, the spatial relation underlying this collection is shown in FIG. 9D where the boundary of the no operation target object set is overlaid on the connected component labeled condition object set. In one embodiment of the invention, the corresponding feature collection is defined as follows:

1. Intersection-component-count: Total number of Condition object set connected components in intersection pixels: (Condition ∩ Target).
2. Intersection-component-count-ratio: Intersection-component-count divided by the total number of components in the Condition object set.
3. Intersection-component-average-area: the average area among the intersection portion of the components having non-zero intersection pixels.
4. Intersection-component-sd-area: the standard deviation of the areas among the intersection portion of the components having non-zero intersection pixels.
5. Intersection-component-average-area-ratio: the average area ratio among the components having non-zero intersection pixels. Where the area ratio of a component is defined as the area of the intersection portion of the component divided by the total area of the component.
6. Intersection-component-sd-area-ratio: the standard deviation of the area ratios among the components having non-zero intersection pixels.
7. Intersection-component-area-entropy: The entropy value of the frequency of each unique component label within the intersection pixels p(i). That is:

$$\sum_{\forall labeli} (P(i)/area) * \log(p(i)/area)$$

where area=Area(Condition ∩ Target) and log( ) is the 10 based logarithm function. It indicates how uniform p(i) is.

Those having ordinary skill in the art should recognize that additional mapping functions could be defined for the mapping between no operation target data and connected component labeled condition data that are within the scope of this invention.

(v) No operation target data and zone of influence (ZOI) labeled condition data

Figure 9E:
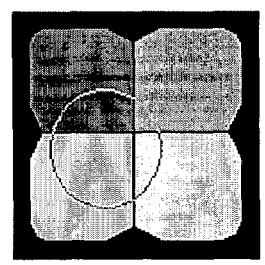
FIG. 9E shows the boundary of the object set of FIG. 5A (as no operation target object set) overlaid on the image of FIG. 4E (as zone of influence labeled condition object set). This illustrates the underlying spatial relation between the no operation target object set and the zone of influence labeled condition object set.

This collection defines the spatial mapping features associated with no operation target data and zone of influence labeled condition data. If the object set in FIG. 5A is the target object set and the object set in FIG. 4A is the condition object set, the spatial relation underlying this collection is shown in FIG. 9E where the boundary of the no operation target object set is overlaid on the zone of influence labeled condition object set. In one embodiment of the invention, the corresponding feature collection is defined as follows:

1. ZOI_intersection-component-count: Total number of Condition object set ZOI connected components within Target region.
2. ZOI_intersection-component-count-ratio: ZOI_intersection-component-count divided by the total number of ZOI components in the Condition object set.
3. ZOI_intersection-component-average-area: the average area among the intersection portion of the ZOI components having non-zero intersection pixels.
4. ZOI_intersection-component-sd-area: the standard deviation of the areas among the intersection portion of the ZOI components having non-zero intersection pixels.
5. ZOI_intersection-component-average-area-ratio: the average area ratio among the ZOI components having non-zero intersection pixels. Where the area ratio of a ZOI component is defined as the area of the intersection portion of the component divided by the total area of the component.
6. ZOI_intersection-component-sd-area-ratio: the standard deviation of the area ratios among the ZOI components having non-zero intersection pixels.
7. ZOI_intersection-component-area-entropy: The entropy value of the frequency of each unique ZOI component label within the intersection pixels p(i). That is:

$$\sum_{\forall labeli} (P(i)/area) * \log(p(i)/area)$$

a. Where area=Area(Target) and log( ) is the 10 based logarithm function.
b. It indicates how uniform p(i) is.
8. Intersection-component-count_proportion: Intersection-component-count divided by ZOI_intersection-component-count.

Those having ordinary skill in the art should recognize that additional mapping functions could be defined for the mapping between no operation target data and zone of influence (ZOI) labeled condition data that are within the scope of this invention.

B. Inner distance group spatial mapping feature calculation

This group maps the spatial relation of the inner distance data of the target object set and the five transformed data of the condition object set.

(i) Inner distance target data and no operation condition data

This collection defines the spatial mapping features associated with inner distance target data and no operation condition data. In one embodiment of the invention, the corresponding feature collection is defined as follows:

1. Target-inner-distance-mean: mean of the Target object set inner distance values of the intersection pixels: (Condition ∩ Target).

2. Target-inner-distance-standard-deviation: standard deviation of the Target object set inner distance values of the intersection pixels: (Condition ∩ Target).
3. Normalized-target-inner-distance-mean: Target-inner-distance-mean divided by the mean inner distance value of the Target object set.
4. Normalized-target-inner-distance-standard-deviation: Target-inner-distance-standard-deviation divided by the mean inner distance value of the Target object set.
5. Target-inner-distance-skewness: skewness of the Target object set inner distance values of the intersection pixels: (Condition ∩ Target).
6. Target-inner-distance-kurtosis: kurtosis of the Target object set inner distance values of the intersection pixels: (Condition ∩ Target). Kurtosis is also a dimensionless value.

Those having ordinary skill in the art should recognize that additional mapping functions could be defined for the mapping between inner distance target data and no operation condition data that are within the scope of this invention.

(ii) Inner distance target data and inner distance transformed condition data

This collection defines the spatial mapping features associated with inner distance target data and inner distance transformed condition data. In one embodiment of the invention, the inner distance values of the target object set and the condition object set are limited to no more than 6. If the distance value is greater than 6, they are quantized into 6 bins. A 6×6 distance co-occurrence matrix can be created called inner_to_inner_distance matrix, I_ID(i,j). The (i,j)th entry of the matrix I_ID(i,j) corresponds to the number of pixels having target inner distance value i and condition inner distance value j where i and j are between 1 and 6. A inner_to_inner_distance probability matrix, $P_{I\_ID}(i,j)$ is defined where $$P_{I\_ID}(i, j) = \frac{I\_ID(i, j)}{\sum_{i=1}^{6} \sum_{j=1}^{6} I\_ID(i, j)}$$

Let $\mu_T = \sum_{i=1}^{6} i \sum_{j=1}^{6} P_{I\_ID}(i, j)$ and $\mu_C = \sum_{i=1}^{6} \sum_{j=1}^{6} j P_{I\_ID}(i, j)$ $$\sigma_T^2 = \sum_{i=1}^{6} (i - \mu_T)^2 \sum_{j=1}^{6} P_{I\_ID}(i, j) \text{ and } \sigma_C^2 = \sum_{i=1}^{6} \sum_{j=1}^{6} (j - \mu_C)^2 P_{I\_ID}(i, j)$$

The corresponding feature collection is defined as follows:
1. $P_{I\_ID}$-Energy: square root of the energy function of the inner_to_inner_distance probability matrix. That is, $$\sqrt{\sum_{i=1}^{6} \sum_{j=1}^{6} P_{I\_ID}(i, j)^2}$$

2. $P_{I\_ID}$-Entropy:

$$-\sum_{i=1}^{6} \sum_{j=1}^{6} P_{I\_ID}(i, j) \log P_{I\_ID}(i, j)$$

3. $P_{I\_ID}$-Correlation:

$$\frac{\sum_{i=1}^{6} \sum_{j=1}^{6} (i - \mu_T)(j - \mu_C) P_{I\_ID}(i, j)}{\sigma_T \sigma_C}$$

4. $P_{I\_ID}$-Inertia:

$$\sum_{i=1}^{6} \sum_{j=1}^{6} (i - j)^2 P_{I\_ID}(i, j)$$

5. $P_{I\_ID}$-Homogeneity:

$$\sum_{i=1}^{6} \sum_{j=1}^{6} \frac{P_{I\_ID}(i, j)}{1 + |i - j|}$$

6. $P_{I\_ID}$-Max_probability:

$$\underset{i=1}{\overset{6}{\text{Max}}} \underset{j=1}{\overset{6}{\text{Max}}} P_{I\_ID}(i, j)$$

7. $P_{I\_ID}$-Cluster_tendency:

$$\sum_{i=1}^{6} \sum_{j=1}^{6} (i + j - \mu_T - \mu_C)^2 P_{I\_ID}(i, j)$$

8. $P_{I\_ID}$-Deep_overlap_tendency:

$$\sum_{i=1}^{6} \sum_{j=1}^{6} (i + j - \mu_T - \mu_C) P_{I\_ID}(i, j)$$

Those having ordinary skill in the art should recognize that additional mapping functions could be defined for the mapping between inner distance target data and inner distance transformed condition data that are within the scope of this invention.

(iii) Inner distance target data and outer distance transformed condition data

This collection defines the spatial mapping features associated with inner distance target data and outer distance transformed condition data. In one embodiment of the invention, the inner distance values of the target object set and the outer distance values of the condition object set are limited to no more than 6. If the distance value is greater than 6, they are quantized into 6 bins. A 6×6 distance co-occurrence matrix can be created called inner_to_outer_distance matrix, I_OD(i,j). The (i,j)th entry of the matrix I_OD(i,j) corresponds to the number of pixels having target inner distance value i and condition outer distance value j where i and j are between 1 and 6. A inner_to_outer_distance probability matrix, $P_{I\_OD}(i,j)$ is defined where $$P_{I\_OD}(i, j) = \frac{I\_OD(i, j)}{\sum_{i=1}^{6}\sum_{j=1}^{6} I\_OD(i, j)}$$

Let $\mu_T = \sum_{i=1}^{6} i \sum_{j=1}^{6} P_{I\_OD}(i, j)$ and $\mu_c = \sum_{i=1}^{6}\sum_{j=1}^{6} j P_{I\_OD}(i, j)$ $$\sigma_T^2 = \sum_{i=1}^{6}(i-\mu_T)^2 \sum_{j=1}^{6} P_{I\_OD}(i, j) \text{ and } \sigma_c^2 = \sum_{i=1}^{6}\sum_{j=1}^{6}(j-\mu_c)^2 P_{I\_OD}(i, j)$$

The corresponding feature collection is defined as follows:

1. $P_{I\_OD}$-Energy: square root of the energy function of the inner_to_outer_distance probability matrix. That is, $$\sqrt{\sum_{i=1}^{6}\sum_{j=1}^{6} P_{I\_OD}(i, j)^2}$$

2. $P_{I\_OD}$-Entropy:

$$-\sum_{i=1}^{6}\sum_{j=1}^{6} P_{I\_OD}(i, j) \log P_{I\_OD}(i, j)$$

3. $P_{I\_OD}$-Correlation:

$$\frac{\sum_{i=1}^{6}\sum_{j=1}^{6}(i-\mu_T)(j-\mu_C) p_{I\_OD}(i, j)}{\sigma_T \sigma_C}$$

4. $P_{I\_OD}$-Inertia:

$$\sum_{i=1}^{6}\sum_{j=1}^{6}(i-j)^2 P_{I\_OD}(i, j)$$

5. $P_{I\_OD}$-Homogeneity:

$$\sum_{i=1}^{6}\sum_{j=1}^{6} \frac{P_{I\_OD}(i, j)}{1+|i-j|}$$

6. $P_{I\_OD}$-Max_probability:

$$\underset{i=1}{\overset{6}{\text{Max}}}\underset{j=1}{\overset{6}{\text{Max}}} P_{I\_OD}(i, j)$$

7. $P_{I\_OD}$-Cluster_tendency:

$$\sum_{i=1}^{6}\sum_{j=1}^{6}(i+j-\mu_T-\mu_C)^2 P_{I\_OD}(i, j)$$

8. $P_{I\_OD}$-Deep_overlap_tendency:

$$\sum_{i=1}^{6}\sum_{j=1}^{6}(i+j-\mu_T-\mu_C) P_{I\_OD}(i, j)$$

Those having ordinary skill in the art should recognize that additional mapping functions could be defined for the mapping between inner distance target data and outer distance transformed condition data that are within the scope of this invention.

(iv) Inner distance target data and connected component labeled condition data

This collection defines the spatial mapping features associated with inner distance target data and connected component labeled condition data. In one embodiment of the invention, the corresponding feature collection is defined as follows:

1. Target-inner-distance-mean-standard-deviation: standard deviation over the mean i of the Target object set inner distance values of the intersection pixels for each component i: (Condition component i ∩ Target).
2. Target-inner-distance-standard-deviation_mean: mean of the standard deviation i of the Target object set inner distance values of the intersection pixels for each component i: (Condition component i ∩ Target).
3. Target-inner-distance-standard-deviation_sd: standard deviation of the standard deviation i of the Target object set inner distance values of the intersection pixels for each component i: (Condition component i ∩ Target).
4. Normalized-target-inner-distance-mean-standard-deviation: Target-inner-distance-mean-standard-deviation divided by the mean inner distance value of the Target object set.
5. Normalized-target-inner-distance-standard-deviation_mean: Target-inner-distance-standard-deviation_mean divided by the mean inner distance value of the Target object set.
6. Normalized-target-inner-distance-standard-deviation_sd: Target-inner-distance-standard-deviation_sd divided by the mean inner distance value of the Target object set.

Those having ordinary skill in the art should recognize that additional mapping functions could be defined for the mapping between inner distance target data and connected component labeled condition data that are within the scope of this invention.

(v) Inner distance target data and zone of influence (ZOI) labeled condition data This collection defines the spatial mapping features associated with inner distance target data and zone of influence labeled condition data. In one embodiment of the invention, the corresponding feature collection is defined as follows:

1. ZOI_target-inner-distance-mean-standard-deviation: standard deviation over the mean i of the Target object set inner distance values of the Condition object set ZOI connected component i within Target region.

2. ZOI_target-inner-distance-standard-deviation_mean: mean of the standard deviation i of the Target object set inner distance values of the Condition object set ZOI connected components within Target region.
3. ZOI_target-inner-distance-standard-deviation_sd: standard deviation of the standard deviation i of the Target object set inner distance values of the Condition object set ZOI connected components within Target region.
4. ZOI_normalized-target-inner-distance-mean-standard-deviation: ZOI_target-inner-distance-mean-standard-deviation divided by the mean inner distance value of the Target object set.
5. ZOI_normalized-target-inner-distance-standard-deviation_mean: ZOI_target-inner-distance-standard-deviation_mean divided by the mean inner distance value of the Target object set.
6. ZOI_normalized-target-inner-distance-standard-deviation_sd: ZOI_target-inner-distance-standard-deviation_mean divided by the mean inner distance value of the Target object set.

Those having ordinary skill in the art should recognize that additional mapping functions could be defined for the mapping between inner distance target data and zone of influence (ZOI) labeled condition data that are within the scope of this invention.

C. Outer distance group spatial mapping feature calculation

This group maps the spatial relation of the outer distance data of the target object set and the five transformed data of the condition object set.

(i) Outer distance target data and no operation condition data

This collection defines the spatial mapping features associated with outer distance target data and no operation condition data. In one embodiment of the invention, the corresponding feature collection is defined as follows:

1. Target-outer-distance-mean: mean of the Target object set outer distance values for the pixels in (Condition ∩ Not Target).
2. Target-outer-distance-standard-deviation: standard deviation of the Target object set outer distance values of the pixels in (Condition ∩ Not Target).
3. Normalized-target-outer-distance-mean: Target-outer-distance-mean divided by the mean outer distance value of the Target object set.
4. Normalized-target-outer-distance-standard-deviation: Target-outer-distance-standard-deviation divided by the mean outer distance value of the Target object set.
5. Target-outer-distance-skewness: skewness of the Target object set outer distance values for the pixels in (Condition ∩ Not Target).
6. Target-outer-distance-kurtosis: kurtosis of the Target object set outer distance values for the pixels in (Condition ∩ Not Target).

Those having ordinary skill in the art should recognize that additional mapping functions could be defined for the mapping between outer distance target data and no operation condition data that are within the scope of this invention.

(ii) Outer distance target data and inner distance transformed condition data

This collection defines the spatial mapping features associated with outer distance target data and inner distance transformed condition data. In one embodiment of the invention, the outer distance values of the target object set and the inner distance condition object set are limited to no more than 6. If the distance value is greater than 6, they are quantized into 6 bins. A 6×6 distance co-occurrence matrix can be created called outer_to_inner_distance matrix, O_ID (i,j). The (i,j)th entry of the matrix O_ID(i,j) corresponds to the number of pixels having target outer distance value i and condition inner distance value j where i and j are between 1 and 6. A outer_to_inner_distance probability matrix, $P_{O\_ID}$ (i,j) is defined where $$P_{O\_ID}(i, j) = \frac{O\_ID(i, j)}{\sum_{i=1}^{6} \sum_{j=1}^{6} O\_ID(i, j)}$$

Let $\mu_T = \sum_{i=1}^{6} i \sum_{j=1}^{6} P_{O\_ID}(i, j)$ and $\mu_C = \sum_{i=1}^{6} \sum_{j=1}^{6} j P_{O\_ID}(i, j)$ $$\sigma_T^2 = \sum_{i=1}^{6} (i - \mu_T)^2 \sum_{j=1}^{6} P_{O\_ID}(i, j) \text{ and}$$

$$\sigma_C^2 = \sum_{i=1}^{6} \sum_{j=1}^{6} (j - \mu_C)^2 P_{O\_ID}(i, j)$$

The corresponding feature collection is defined as follows:

1. $P_{O\_ID}$-Energy: square root of the energy function of the outer_to_inner_distance probability matrix. That is, $$\sqrt{\sum_{i=1}^{6} \sum_{j=1}^{6} P_{O\_ID}(i, j)^2}$$

2. $P_{O\_OD}$-Entropy:

$$-\sum_{i=1}^{6} \sum_{j=1}^{6} P_{O\_ID}(i, j) \log P_{O\_ID}(i, j)$$

3. $P_{O\_ID}$-Correlation:

$$\frac{\sum_{i=1}^{6} \sum_{j=1}^{6} (i - \mu_T)(j - \mu_C) P_{O\_ID}(i, j)}{\sigma_T \sigma_C}$$

4. $P_{O\_ID}$-Inertia:

$$\sum_{i=1}^{6} \sum_{j=1}^{6} (i - j)^2 P_{O\_ID}(i, j)$$

5. $P_{O\_ID}$-Homogeneity:

$$\sum_{i=1}^{6} \sum_{j=1}^{6} \frac{P_{O\_ID}(i, j)}{1 + |i - j|}$$

6. $P_{O\_ID}$-Max_probability:

$$\underset{i=1}{\overset{6}{\text{Max}}} \underset{j=1}{\overset{6}{\text{Max}}} P_{O\_ID}(i, j)$$

7. $P_{O\_ID}$-Cluster_tendency:

$$\sum_{i=1}^{6} \sum_{j=1}^{6} (i+j-\mu_T-\mu_C)^2 P_{O\_ID}(i, j)$$

8. $P_{O\_ID}$-Deep_overlap_tendency:

$$\sum_{i=1}^{6} \sum_{j=1}^{6} (i+j-\mu_T-\mu_C) P_{O\_ID}(i, j)$$

Those having ordinary skill in the art should recognize that additional mapping functions could be defined for the mapping between outer distance target data and inner distance transformed condition data that are within the scope of this invention.

(iii) Outer distance target data and outer distance transformed condition data

This collection defines the spatial mapping features associated with outer distance target data and outer distance transformed condition data. In one embodiment of the invention, the outer distance values of the target and the condition object sets are limited to no more than 6. If the distance value is greater than 6, they are quantized into 6 bins. A 6×6 distance co-occurrence matrix can be created called outer_to_outer_distance matrix, O_OD(i,j). The (i,j) th entry of the matrix O_OD(i,j) corresponds to the number of pixels having target outer distance value i and condition outer distance value j where i and j are between 1 and 6. A outer_to_outer_distance probability matrix, $P_{O\_OD}$(i,j) is defined where $$P_{O\_OD}(i, j) = \frac{O\_OD(i, j)}{\sum_{i=1}^{6} \sum_{j=1}^{6} O\_OD(i, j)}$$

Let $\mu_T = \sum_{i=1}^{6} i \sum_{j=1}^{6} P_{O\_OD}(i, j)$ and $\mu_C = \sum_{i=1}^{6} \sum_{j=1}^{6} j P_{O\_OD}(i, j)$ $$\sigma_T^2 = \sum_{i=1}^{6} (i-\mu_T)^2 \sum_{j=1}^{6} P_{O\_OD}(i, j) \text{ and}$$

$$\sigma_C^2 = \sum_{i=1}^{6} \sum_{j=1}^{6} (j-\mu_C)^2 P_{O\_OD}(i, j)$$

The corresponding feature collection is defined as follows:

1. $P_{O\_OD}$-Energy: square root of the energy function of the outer_to_outer_distance probability matrix. That is, $$\sqrt{\sum_{i=1}^{6} \sum_{j=1}^{6} P_{O\_OD}(i, j)^2}$$

2. $P_{O\_OD}$-Entropy:

$$-\sum_{i=1}^{6} \sum_{j=1}^{6} P_{O\_OD}(i, j) \log P_{O\_OD}(i, j)$$

3. $P_{O\_OD}$-Correlation:

$$\frac{\sum_{i=1}^{6} \sum_{j=1}^{6} (i-\mu_T)(j-\mu_C) P_{O\_OD}(i, j)}{\sigma_T \sigma_C}$$

4. $P_{O\_OD}$-Inertia:

$$\sum_{i=1}^{6} \sum_{j=1}^{6} (i-j)^2 P_{O\_OD}(i, j)$$

5. $P_{O\_OD}$-Homogeneity:

$$\sum_{i=1}^{6} \sum_{j=1}^{6} \frac{P_{O\_OD}(i, j)}{1+|i-j|}$$

6. $P_{O\_OD}$-Max_probability:

$$\underset{i=1}{\overset{6}{\text{Max}}} \underset{j=1}{\overset{6}{\text{Max}}} P_{O\_OD}(i, j)$$

7. $P_{O\_OD}$-Cluster_tendency:

$$\sum_{i=1}^{6} \sum_{j=1}^{6} (i+j-\mu_T-\mu_C)^2 P_{O\_OD}(i, j)$$

8. $P_{O\_OD}$-Inside_overlap_tendency:

$$\sum_{i=1}^{6} \sum_{j=1}^{6} (i+j-\mu_T-\mu_C) P_{O\_OD}(i, j)$$

Those having ordinary skill in the art should recognize that additional mapping functions could be defined for the mapping between outer distance target data and outer distance transformed condition data that are within the scope of this invention.

(iv) Outer distance target data and connected component labeled condition data

This collection defines the spatial mapping features associated with outer distance target data and connected component labeled condition data. In one embodiment of the invention, the corresponding feature collection is defined as follows:

1. Target-outer-distance-mean-standard-deviation: standard deviation over the mean i of the Target object set outer distance values of the intersection pixels for each component i: (Condition component i ∩ Not Target).
2. Target-outer-distance-standard-deviation_mean: mean of the standard deviation i of the Target object set outer distance values of the intersection pixels for each component i: (Condition component i ∩ Not Target).
3. Target-outer-distance-standard-deviation_sd: standard deviation of the standard deviation i of the Target object set outer distance values of the intersection pixels for each component i: (Condition component i ∩ Not Target).
4. Normalized-target-outer-distance-mean-standard-deviation: Target-outer-distance-mean-standard-deviation divided by the mean outer distance value of the Target object set.
5. Normalized-target-outer-distance-standard-deviation_mean: Target-outer-distance-standard-deviation_mean divided by the mean outer distance value of the Target object set.
6. Normalized-target-outer-distance-standard-deviation_sd: Target-outer-distance-standard-deviation_sd divided by the mean outer distance value of the Target object set.

Those having ordinary skill in the art should recognize that additional mapping functions could be defined for the mapping between outer distance target data and connected component labeled condition data that are within the scope of this invention.

(v) Outer distance target data and zone of influence (ZOI) labeled condition data This collection defines the spatial mapping features associated with outer distance target data and zone of influence labeled condition data. In one embodiment of the invention, the corresponding feature collection is defined as follows:

1. ZOI_target-outer-distance-mean-standard-deviation: standard deviation over the mean i of the Target object set outer distance values of the Condition object set ZOI connected component i outside Target region.
2. ZOI_target-outer-distance-standard-deviation_mean: mean of the standard deviation i of the Target object set outer distance values of the Condition object set ZOI connected components outside Target region.
3. ZOI_target-outer-distance-standard-deviation_sd: standard deviation of the standard deviation i of the Target object set outer distance values of the Condition object set ZOI connected components outside Target region.
4. ZOI_normalized-target-outer-distance-mean-standard-deviation: ZOI_target-outer-distance-mean-standard-deviation divided by the mean outer distance value of the Target object set.
5. ZOI_normalized-target-outer-distance-standard-deviation_mean: ZOI_target-outer-distance-standard-deviation_mean divided by the mean outer distance value of the Target object set.
6. ZOI_normalized-target-outer-distance-standard-deviation_sd: ZOI_target-outer-distance-standard-deviation_sd divided by the mean outer distance value of the Target object set.

Those having ordinary skill in the art should recognize that additional mapping functions could be defined for the mapping between outer distance target data and zone of influence (ZOI) labeled condition data that are within the scope of this invention.

D. Connected component labeled group spatial mapping feature calculation

This group maps the spatial relations of the connected component labeled data of the target object set and the five transformed data of the condition object set.

(i) Connected component labeled target data and no operation condition data

This collection defines the spatial mapping features associated with connected component labeled target data and no operation condition data. In one embodiment of the invention, the corresponding feature collection is defined as follows:

1. Intersection-target-component-count: Total number of Target object set connected components in intersection pixels: (Condition ∩ Target).
2. Intersection-target-component-count-ratio: Intersection-target-component-count divided by the total number of components in the Target object set.
3. Intersection-target-component-average-area: the average area among the intersection portion of the target components having non-zero intersection pixels.
4. Intersection-target-component-sd-area: the standard deviation of the areas among the intersection portion of the target components having non-zero intersection pixels.
5. Intersection-target-component-average-area-ratio: the average area ratio among the target components having non-zero intersection pixels. Where the area ratio of a target component is defined as the area of the intersection portion of the target component divided by the total area of the component.
6. Intersection-target-component-sd-area-ratio: the standard deviation of the area ratios among the target components having non-zero intersection pixels.
7. Intersection-target-component-area-entropy: The entropy value of the frequency of each unique target component label within the intersection pixels p(i). That is:

$$\sum_{\forall label\, i} (P(i)/area) * \log(p(i)/area)$$

Where area=Area(Condition ∩ Target) and log( ) is the 10 based logarithm function. It indicates how uniform p(i) is.

Those having ordinary skill in the art should recognize that additional mapping functions could be defined for the mapping between connected component labeled target data and no operation condition data that are within the scope of this invention.

(ii) Connected component labeled target data and inner distance transformed condition data This collection defines the spatial mapping features associated with connected component labeled target data and inner distance transformed condition data. In one embodiment of the invention, the corresponding feature collection is defined as follows:

1. Condition-inner-distance-mean-standard-deviation: standard deviation over the mean i of the Condition object set inner distance values of the intersection pixels for each Target component i (Condition ∩ Target component i).

2. Condition-inner-distance-standard-deviation_mean: mean of the standard deviation i of the Condition object set inner distance values of the intersection pixels for each Target component i (Condition ∩ Target component i).
3. Condition-inner-distance-standard-deviation_sd: standard deviation of the standard deviation i of the Condition object set inner distance values of the intersection pixels for each Target component i (Condition ∩ Target component i).
4. Normalized-condition-inner-distance-mean-standard-deviation: Condition-inner-distance-mean-standard-deviation divided by the mean inner distance value of the Condition object set.
5. Normalized-condition-inner-distance-standard-deviation_mean: Condition-inner-distance-standard-deviation_mean divided by the mean inner distance value of the Condition object set.
6. Normalized-condition-inner-distance-standard-deviation_sd: Condition-inner-distance-standard-deviation_sd divided by the mean inner distance value of the Condition object set.

Those having ordinary skill in the art should recognize that additional mapping functions could be defined for the mapping between connected component labeled target data and inner distance transformed condition data that are within the scope of this invention.

(iii) Connected component labeled target data and outer distance transformed condition data This collection defines the spatial mapping features associated with connected component labeled target data and outer distance transformed condition data. In one embodiment of the invention, the corresponding feature collection is defined as follows:

1. Condition-outer-distance-mean-standard-deviation: standard deviation over the mean i of the Condition object set outer distance values of the intersection pixels for each Target component i in (Not Condition ∩ Target component i).
2. Condition-outer-distance-standard-deviation_mean: mean of the standard deviation i of the Condition object set outer distance values of the intersection pixels for each Target component i in (Not Condition ∩ Target component i).
3. Condition-outer-distance-standard-deviation_sd: standard deviation of the standard deviation i of the Condition object set outer distance values of the intersection pixels for each Target component i in (Not Condition ∩ Target component i).
4. Normalized-condition-outer-distance-mean-standard-deviation: Condition-outer-distance-mean-standard-deviation divided by the mean outer distance value of the Condition object set.
5. Normalized-condition-outer-distance-standard-deviation_mean: Condition-outer-distance-standard-deviation_mean divided by the mean outer distance value of the Condition object set.
6. Normalized-condition-outer-distance-standard-deviation_sd: Condition-outer-distance-standard-deviation_sd divided by the mean outer distance value of the Condition object set.

Those having ordinary skill in the art should recognize that additional mapping functions could be defined for the mapping between connected component labeled target data and outer distance transformed condition data that are within the scope of this invention.

(iv) Connected component labeled target data and connected component labeled condition data This collection defines the spatial mapping features associated with connected component labeled target data and connected component labeled condition data. In one embodiment of the invention, the corresponding feature collection is defined as follows:

1. Target_intersection-component-count_mean: mean of the number of Condition object set connected components i intersect with Target component i (for Condition ∩ Target component i≠Φ).
2. Target_intersection-component-count_sd: the standard deviation among the number of Condition object set connected components i intersect with Target component i (for Condition ∩ Target component i≠Φ).
3. Target_intersection-component-count-ratio_mean: Target_intersection-component-count_mean divided by the total number of components in the Condition object set.
4. Target_intersection-component-count-ratio_sd: Target_intersection-component-count_sd divided by the total number of components in the Condition object set.
5. Target_intersection-component-average-area_mean: mean of the average area i of Condition object set connected components intersect with Target component i (for Condition ∩ Target component i≠Φ).
6. Target_intersection-component-average-area_sd: the standard deviation among the average area i of Condition object set connected components intersect with Target component i (for Condition ∩ Target component i≠Φ).
7. Target_intersection-component-average-area-ratio_mean: mean of the average area ratio i of Condition object set connected components intersect with Target component i (for Condition ∩ Target component i≠Φ). Where the area ratio of a component is defined as the area of the intersection portion of the component divided by the total area of the component.
8. Target_intersection-component-average-area-ratio_sd: the standard deviation among the average area ratio i of Condition object set connected components intersect with Target component i (for Condition ∩ Target component i≠Φ). Where the area ratio of a component is defined as the area of the intersection portion of the component divided by the total area of the component.
9. Target_intersection-component-area-entropy_mean: mean of the entropy value k of the frequency of each unique Condition component label within the intersection pixels p(i) for Target component k where Condition ∩ Target component k≠Φ. 10. Target_intersection-component-area-entropy_sd: the standard deviation among the entropy value k of the frequency of each unique Condition component label within the intersection pixels p(i) for Target component k where Condition ∩ Target component k≠Φ.

Those having ordinary skill in the art should recognize that additional mapping functions could be defined for the mapping between connected component labeled target data and connected component labeled condition data that are within the scope of this invention.

(v) Connected component labeled target data and zone of influence (ZOI) labeled condition data This collection defines the spatial mapping features associated with connected component labeled target data and zone of influence labeled condition data. In one embodiment of the invention, the corresponding feature collection is defined as follows:

1. Target_intersection-ZOI-component-count_mean: mean of the number of Condition object set ZOI connected components i intersect with Target component i
2. Target_intersection-ZOI-component-count_sd: the standard deviation among the number of Condition object set ZOI connected components i intersect with Target component i
3. Target_intersection-ZOI-component-count-ratio_mean: Target_intersection-ZOI-component-count_mean divided by the total number of ZOI components in the Condition object set.
4. Target_intersection-ZOI-component-count-ratio_sd: Target_intersection-ZOI-component-count_sd divided by the total number of ZOI components in the Condition object set.
5. Target_intersection-ZOI-component-average-area_mean: mean of the average area i of Condition object set ZOI connected components intersect with Target component i
6. Target_intersection-ZOI-component-average-area_sd: the standard deviation among the average area i of Condition object set ZOI connected components intersect with Target component i
7. Target_intersection-ZOI-component-average-area-ratio_mean: mean of the average area ratio i of Condition object set ZOI connected components intersect with Target component i. Where the area ratio of a ZOI component is defined as the area of the intersection portion of the ZOI component divided by the total area of the ZOI component.
8. Target_intersection-ZOI-component-average-area-ratio_sd: the standard deviation among the average area ratio i of Condition object set ZOI connected components intersect with Target component i. Where the area ratio of a ZOI component is defined as the area of the intersection portion of the ZOI component divided by the total area of the ZOI component.
9. Target_intersection-ZOI-component-area-entropy_mean: mean of the entropy value k of the frequency of each unique Condition ZOI component label within the intersection pixels p(i) for Target component k.
10. Target_intersection-ZOI-component-area-entropy_sd: the standard deviation among the entropy value k of the frequency of each unique Condition ZOI component label within the intersection pixels p(i) for Target component k.

Those having ordinary skill in the art should recognize that additional mapping functions could be defined for the mapping between connected component labeled target data and zone of influence (ZOI) labeled condition data that are within the scope of this invention.

E. ZOI group spatial mapping feature calculation

This group maps the spatial relations of the ZOI labeled data of the target object set and the five transformed data of the condition object set.

(i) ZOI Labeled target data and no operation condition data

This collection defines the spatial mapping features associated with ZOI labeled target data and no operation condition data. In one embodiment of the invention, the corresponding feature collection is defined as follows:

1. Intersection-target-ZOI-component-count: Total number of Target object set ZOI connected components in Condition pixels.
2. Intersection-target-ZOI-component-count-ratio: Intersection-target-ZOI-component-count divided by the total number of in the Target ZOI components.
3. Intersection-target-ZOI-component-average-area: the average area among the condition pixel portion of the target ZOI components having non-zero intersection pixels.
4. Intersection-target-ZOI-component-sd-area: the standard deviation of the areas among the condition pixel portion of the target ZOI components having non-zero intersection pixels.
5. Intersection-target-ZOI-component-average-area-ratio: the average area ratio among the target ZOI components having non-zero condition pixels. Where the area ratio of a target ZOI component is defined as the area of the condition pixel portion of the target ZOI component divided by the total area of the ZOI component.
6. Intersection-target-ZOI-component-sd-area-ratio: the standard deviation of the area ratios among the target ZOI components having non-zero condition pixels.
7. Intersection-target-ZOI-component-area-entropy: The entropy value of the frequency of each unique target ZOI component label within the condition pixels p(i). That is:

$$\sum_{\forall label i} (P(i)/area) * \log(p(i)/area)$$

Where area=Area(Condition ∩ Target ZOI) and log( ) is the 10 based logarithm function. It indicates how uniform p(i) is.

Those having ordinary skill in the art should recognize that additional mapping functions could be defined for the mapping between ZOI labeled target data and no operation condition data that are within the scope of this invention.

(ii) ZOI labeled target data and inner distance transformed condition data

This collection defines the spatial mapping features associated with ZOI labeled target data and inner distance transformed condition data. In one embodiment of the invention, the corresponding feature collection is defined as follows:

1. Condition-inner-distance-mean-ZOI-standard-deviation: standard deviation over the mean i of the Condition object set inner distance values of the intersection pixels for each Target ZOI component i (Condition ∩ Target ZOI component i).
2. Condition-inner-distance-standard-deviation-ZOI-mean: mean of the standard deviation i of the Condition object set inner distance values of the intersection pixels for each Target ZOI component i (Condition ∩ Target ZOI component i).
3. Condition-inner-distance-standard-deviation-ZOI_sd: standard deviation of the standard deviation i of the Condition object set inner distance values of the intersection pixels for each Target ZOI component i (Condition ∩ Target ZOI component i).
4. Normalized-condition-inner-distance-mean-ZOI-standard-deviation: Condition-inner-distance-mean-ZOI-standard-deviation divided by the mean inner distance value of the Condition object set.

5. Normalized-condition-inner-distance-standard-deviation-ZOI_mean: Condition-inner-distance-standard-deviation-ZOI_mean divided by the mean inner distance value of the Condition object set.
6. Normalized-condition-inner-distance-standard-deviation-ZOI_sd: Condition-inner-distance-standard-deviation-ZOI_sd divided by the mean inner distance value of the Condition object set.

Those having ordinary skill in the art should recognize that additional mapping functions could be defined for the mapping between ZOI labeled target data and inner distance transformed condition data that are within the scope of this invention.

(iii) ZOI labeled target data and outer distance transformed condition data

This collection defines the spatial mapping features associated with ZOI labeled target data and outer distance transformed condition data. In one embodiment of the invention, the corresponding feature collection is defined as follows:

1. Condition-outer-distance-mean-ZOI-standard-deviation: standard deviation over the mean i of the Condition object set outer distance values of the intersection pixels for each Target ZOI component i in (Not Condition ∩ Target ZOI component i).
2. Condition-outer-distance-standard-deviation-ZOI_mean: mean of the standard deviation i of the Condition object set outer distance values of the intersection pixels for each Target component i in (Not Condition ∩ Target ZOI component i).
3. Condition-outer-distance-standard-deviation-ZOI_sd: standard deviation of the standard deviation i of the Condition object set outer distance values of the intersection pixels for each Target component i in (Not Condition ∩ Target ZOI component i).
4. Normalized-target-outer-distance-mean-ZOI-standard-deviation: Condition-outer-distance-mean-ZOI-standard-deviation divided by the mean outer distance value of the Condition object set.
5. Normalized-condition-outer-distance-standard-deviation-ZOI_mean: Condition-outer-distance-standard-deviation ZOI_mean divided by the mean outer distance value of the Condition object set.
6. Normalized-condition-outer-distance-standard-deviation-ZOI_sd: Condition-outer-distance-standard-deviation-ZOI_sd divided by the mean outer distance value of the Condition object set.

Those having ordinary skill in the art should recognize that additional mapping functions could be defined for the mapping between ZOI labeled target data and outer distance transformed condition data that are within the scope of this invention.

(iv) ZOI labeled target data and connected component labeled condition data

This collection defines the spatial mapping features associated with ZOI labeled target data and connected component labeled condition data. In one embodiment of the invention, the corresponding feature collection is defined as follows:

1. Target-ZOI_intersection-component-count_mean: mean of the number of Condition object set connected components i intersect with Target ZOI component i (for Condition ∩ Target ZOI component i≠Φ).
2. Target-ZOI_intersection-component-count_sd: the standard deviation among the number of Condition object set connected components i intersect with Target ZOI component i (for Condition ∩ Target ZOI component i≠Φ).
3. Target-ZOI_intersection-component-count-ratio_mean: Target-ZOI_intersection-component-count_mean divided by the total number of components in the Condition object set.
4. Target-ZOI_intersection-component-count-ratio_sd: Target-ZOI_intersection-component-count_sd divided by the total number of components in the Condition object set.
5. Target-ZOI_intersection-component-average-area_mean: mean of the average area i of Condition object set connected components intersect with Target ZOI component i (for Condition ∩ Target—ZOI ZOI component i≠Φ).
6. Target-ZOI_intersection-component-average-area_sd: the standard deviation among the average area i of Condition object set connected components intersect with Target ZOI component i (for Condition ∩ Target ZOI component i≠Φ).
7. Target-ZOI_intersection-component-average-area-ratio_mean: mean of the average area ratio i of Condition object set connected components intersect with Target ZOI component i (for Condition ∩ Target ZOI component i≠Φ). Where the area ratio of a component is defined as the area of the intersection portion of the component divided by the total area of the component.
8. Target-ZOI_intersection-component-average-area-ratio_sd: the standard deviation among the average area ratio i of Condition object set connected components intersect with Target ZOI component i (for Condition ∩ Target ZOI component i≠Φ). Where the area ratio of a component is defined as the area of the intersection portion of the component divided by the total area of the component.
9. Target-ZOI_intersection-component-area-entropy_mean: mean of the entropy value k of the frequency of each unique Condition component label within the intersection pixels p(i) for Target ZOI component k where Condition ∩ Target ZOI component k≠Φ.
10. Target-ZOI_intersection-component-area-entropy_sd: the standard deviation among the entropy value k of the frequency of each unique Condition component label within the intersection pixels p(i) for Target ZOI component k where Condition ∩ Target ZOI component k≠Φ.

Those having ordinary skill in the art should recognize that additional mapping functions could be defined for the mapping between ZOI labeled target data and connected component labeled condition data that are within the scope of this invention.

(v) ZOI labeled target data ZOI labeled condition data

This collection defines the spatial mapping features associated with ZOI labeled target data and zone of influence (ZOI) labeled condition data. In one embodiment of the invention, the corresponding feature collection is defined as follows:

1. Target-ZOI_intersection-ZOI-component-count_mean: mean of the number of Condition object set ZOI connected components i intersect with Target ZOI component i
2. Target-ZOI_intersection-ZOI-component-count_sd: the standard deviation among the number of Condition object set ZOI connected components i intersect with Target ZOI component i 3. Target-ZOI_intersection-ZOI-component-count-ratio_mean: Target-ZOI_intersection-ZOI-component-count_mean divided by the total number of ZOI components in the Condition object set.
4. Target-ZOI_intersection-ZOI-component-count-ratio_sd: Target-ZOI_intersection-ZOI-component-count_sd divided by the total number of ZOI components in the Condition object set.
5. Target-ZOI_intersection-ZOI-component-average-area_mean: mean of the average area i of Condition object set ZOI connected components intersect with Target ZOI component i
6. Target-ZOI_intersection-ZOI-component-average-area_sd: the standard deviation among the average area i of Condition object set ZOI connected components intersect with Target ZOI component i
7. Target-ZOI_intersection-ZOI-component-average-area-ratio_mean: mean of the average area ratio i of Condition object set ZOI connected components intersect with Target ZOI component i. Where the area ratio of a ZOI component is defined as the area of the intersection portion of the ZOI component divided by the total area of the ZOI component.
8. Target-ZOI_intersection-ZOI-component-average-area-ratio_sd: the standard deviation among the average area ratio i of Condition object set ZOI connected components intersect with Target ZOI component i. Where the area ratio of a ZOI component is defined as the area of the intersection portion of the ZOI component divided by the total area of the ZOI component.
9. Target-ZOI_intersection-ZOI-component-area-entropy_mean: mean of the entropy value k of the frequency of each unique Condition ZOI component label within the intersection pixels p(i) for Target ZOI component k.
10. Target-ZOI_intersection-ZOI-component-area-entropy_sd: the standard deviation among the entropy value k of the frequency of each unique Condition ZOI component label within the intersection pixels p(i) for Target ZOI component k.

Those having ordinary skill in the art should recognize that additional mapping functions could be defined for spatial mapping feature calculations that are within the scope of this invention.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices and dimensionality and relations, and that various modifications, both as to the implementation details and detailed procedures, can be accomplished without departing from the scope of the invention itself.

What is claimed is:

1. A computerized automatic spatial reasoning method to create spatial reasoning rules to characterize subtle physical, structural or geometrical conditions comprising the steps of:
   a) Inputting a plurality of image object sets, each object contains its associated image pixels;
   b) Designating one of the image object sets as target object set and another object set as condition object set;
   c) Calculating spatial mapping features for the target object set from transformed images of the target object set and the condition object set;
   d) Performing spatial mapping feature learning using the spatial mapping features to create at least one salient spatial mapping feature output;
   e) Performing spatial reasoning rule learning by a supervised learning method using the at least one spatial mapping feature to create at least one spatial reasoning rule output;
   f) Using the spatial reasoning rule output to characterize spatial relations of multiple sets of objects for applications such as geographical information systems, cell image informatics, semiconductor or electronic automatic defect classification or military automatic target classification applications.

2. The computerized automatic spatial reasoning method of claim 1 wherein the spatial mapping feature learning process further comprises the steps of:
   a) Performing spatial mapping feature set generation using the plurality of image object sets to create a spatial mapping feature set output;
   b) Performing feature learning using the spatial mapping feature set to create at least one salient spatial mapping feature output;
   c) Using events associated with the feature sets as the labels for the spatial mapping features.

3. The computerized automatic spatial reasoning of claim 2 wherein the spatial mapping feature set is generated by the steps of:
   a) Transforming each object set by several image label propagation operations to generate transformed images of the target object set and the condition object set;
   b) Applying spatial correlation between the transformed images of the target object set and the condition object set.

4. The computerized automatic spatial reasoning of claim 2 wherein the feature learning method consists of the steps of:
   a) Performing feature selection to select a subset of features that could discriminate between pixels of different classes;
   b) Performing feature transformation to transform the original feature set into a subset of derived features.

5. A computerized automatic two image object set spatial mapping feature generation method to create spatial mapping features that can be used to characterize subtle physical, structural or geometrical conditions comprises the steps of:
   a) Inputting a first image object set containing its associated image pixels, designated as target image object set;
   b) Inputting a second image object set containing its associated image pixels, designated as condition image object set;
   c) Performing label propagation operation assigning labels to image pixels on the target image object set and the condition image object set to create target image object set transformed data and condition image object set transformed data output;
   d) Performing a spatial mapping features calculation using the target image object set transformed data and the condition image object set transformed data to create an image spatial mapping features output;
   e) Using the image spatial mapping features output to characterize spatial relations of two image object sets for applications such as geographical information systems, cell image informatics, semiconductor or electronic automatic defect classification or military automatic target classification applications.

6. The computerized automatic two image object set spatial mapping feature generation method of claim 5 wherein the label propagation operation is selected from the set consisting of
   a) No operation,
   b) Inner distance transformation of the image pixels,
   c) Outer distance transformation of the image pixels,
   d) Connected component labeling of the image pixels, and
   e) Zone of influence labeling of the image pixels.

7. The computerized automatic two image object set spatial mapping feature generation method of claim 5 wherein the spatial mapping features calculation includes the spatial mapping features associated with no operation target image data and no operation condition image data that is selected from the set consisting of
   a) Condition ratio as the probability of condition image object set included in the target image object set, and
   b) Intersection ratio: Area(Condition ∩ Target)/Area (Condition U Target).

8. The computerized automatic two image object set spatial mapping feature generation method of claim 5 wherein the spatial mapping features calculation includes the spatial mapping features associated with no operation target data and inner distance transformed condition data that is selected from the set consisting of
   a) Inner distance mean,
   b) Inner distance standard deviation,
   c) Normalized inner distance mean,
   d) Normalized inner distance standard deviation,
   e) Inner distance skewness, and
   f) Inner distance kurtosis.

9. The computerized automatic two image object set spatial mapping feature generation method of claim 5 wherein the spatial mapping features calculation includes the spatial mapping features associated with no operation target image data and outer distance transformed condition image data that is selected from the set consisting of
   a) Outer distance mean,
   b) Outer distance standard deviation,
   c) Normalized outer distance mean;
   d) Normalized outer distance standard deviation,
   e) Outer distance skewness, and
   f) Outer distance kurtosis.

10. The computerized automatic two image object set spatial mapping feature generation method of claim 5 wherein the spatial mapping features calculation includes the spatial mapping features associated with no operation target data and connected component labeled condition data that is selected from the set consisting of
    a) Intersection-component-count,
    b) Intersection-component-count-ratio,
    c) Intersection-component-average-area,
    d) intersection-component-sd-area,
    e) Intersection-component-average-area-ratio,
    f) Intersection-component-sd-area-ratio, and
    g) Intersection-component-area-entropy.

11. The computerized automatic two image object set spatial mapping feature generation method of claim 5 wherein the spatial mapping features calculation includes the spatial mapping features associated with no operation target data and zone of influence labeled condition data that is selected from the set consisting of
    a) ZOI_intersection-component-count,
    b) ZOI_intersection-component-count-ratio,
    c) ZOI_intersection-component-average-area,
    d) ZOI_intersection-component-sd-area,
    e) ZOI_intersection-component-average-area-ratio,
    f) ZOI_intersection-component-sd-area-ratio,
    g) ZOI_intersection-component-area-entropy, and
    h) Intersection-component-count_proportion.

12. The computerized automatic two image object set spatial mapping feature generation method of claim 5 wherein the spatial mapping features calculation includes the spatial mapping features associated with inner distance target data and no operation condition data that is selected from the set consisting of:
    a) Target-inner-distance-mean,
    b) Target-inner-distance-standard-deviation,
    c) Normalized-target-inner-distance-mean,
    d) Normalized-target-inner-distance-standard-deviation,
    e) Target-inner-distance-skewness, and
    f) Target-inner-distance-kurtosis.

13. The computerized automatic two image object set spatial mapping feature generation method of claim 5 wherein the spatial mapping features calculation includes the spatial mapping features associated with inner distance target data and inner distance transformed condition data that is selected from the set consisting of:
    a) $P_{L\_ID}$-Energy,
    b) $P_{L\_ID}$-Entropy,
    c) $P_{L\_ID}$-Correlation,
    d) $P_{L\_ID}$-Inertia,
    e) $P_{L\_ID}$-Homogeneity,
    f) $P_{L\_ID}$-Max_probability,
    g) $P_{L\_ID}$-Cluster_tendency, and
    h) $P_{L\_ID}$-Deep_overlap_tendency.

14. The computerized automatic two image object set spatial mapping feature generation method of claim 5 wherein the spatial mapping features calculation includes the spatial mapping features associated with inner distance target data and outer distance transformed condition data that is selected from the set consisting of:
    a) $P_{L\_OD}$-Energy,
    b) $P_{L\_OD}$-Entropy,
    c) $P_{L\_OD}$-Correlation,
    d) $P_{L\_OD}$-Inertia,
    e) $P_{L\_OD}$-Homogeneity,
    f) $P_{L\_OD}$-Max_probability,
    g) $P_{L\_OD}$-Cluster_tendency, and
    h) $P_{L\_OD}$-Deep_overlap_tendency.

15. The computerized automatic two image object set spatial mapping feature generation method of claim 5 wherein the spatial mapping features calculation includes the spatial mapping features associated with inner distance target data and connected component labeled condition data that is selected from the set consisting of:
    a) Target-inner-distance-mean-standard-deviation,
    b) Target-inner-distance-standard-deviation_mean,
    c) Target-inner-distance-standard-deviation_sd,
    d) Normalized-target-inner-distance-mean-standard-deviation,
    e) Normalized-target-inner-distance-standard-deviation_mean, and
    f) Normalized-target-inner-distance-standard-deviation_sd.

16. The computerized automatic two image object set spatial mapping feature generation method of claim 5 wherein the spatial mapping features calculation includes the spatial mapping features associated with inner distance target data and zone of influence labeled condition data that is selected from the set consisting of:
    a) ZOI_target-inner-distance-mean-standard-deviation,
    b) ZOI_target-inner-distance-standard-deviation_mean,
    c) ZOI_target-inner-distance-standard-deviation_sd, d) ZOI_normalized-target-inner-distance-mean-standard-deviation,
e) ZOI_normalized-target-inner-distance-standard-deviation_mean, and
f) ZOI_normalized-target-inner-distance-standard-deviation_sd.

17. The computerized automatic two image object set spatial mapping feature generation method of claim 5 wherein the spatial mapping features calculation includes the spatial mapping features associated with outer distance target data and no operation condition data that is selected from the set consisting of:
 a) Target-outer-distance-mean,
 b) Target-outer-distance-standard-deviation,
 c) Normalized-target-outer-distance-mean,
 d) Normalized-target-outer-distance-standard-deviation,
 e) Target-outer-distance-skewness, and
 f) Target-outer-distance-kurtosis.

18. The computerized automatic two image object set spatial mapping feature generation method of claim 5 wherein the spatial mapping features calculation includes the spatial mapping features associated with outer distance target data and inner distance transformed condition data that is selected from the set consisting of:
 a) $P_{O\_ID}$-Energy,
 b) $P_{O\_ID}$-Entropy,
 c) $P_{O\_ID}$-Correlation,
 d) $P_{O\_ID}$-Inertia,
 e) $P_{O\_ID}$-Homogeneity,
 f) $P_{O\_ID}$-Max_probability,
 g) $P_{O\_ID}$-Cluster_tendency, and
 h) $P_{O\_ID}$-Deep_overlap_tendency.

19. The computerized automatic two image object set spatial mapping feature generation method of claim 5 wherein the spatial mapping features calculation includes the spatial mapping features associated with outer distance target data and outer distance transformed condition data that is selected from the set consisting of:
 a) $P_{O\_OD}$-Energy,
 b) $P_{O\_OD}$-Entropy,
 c) $P_{O\_OD}$-Correlation,
 d) $P_{O\_OD}$-Inertia,
 e) $P_{O\_OD}$-Homogeneity,
 f) $P_{O\_OD}$-Max_probability,
 g) $P_{O\_OD}$-Cluster_tendency, and
 h) $P_{O\_OD}$-Inside_overlap_tendency.

20. The computerized automatic two image object set spatial mapping feature generation method of claim 5 wherein the spatial mapping features calculation includes the spatial mapping features associated with outer distance target data and connected component labeled condition data that is selected from the set consisting of:
 a) Target-outer-distance-mean-standard-deviation,
 b) Target-outer-distance-standard-deviation_mean,
 c) Target-outer-distance-standard-deviation_sd,
 d) Normalized-target-outer-distance-mean-standard-deviation,
 e) Normalized-target-outer-distance-standard-deviation_mean, and
 f) Normalized-target-outer-distance-standard-deviation_sd.

21. The computerized automatic two image object set spatial mapping feature generation method of claim 5 wherein the spatial mapping features calculation includes the spatial mapping features associated with outer distance target data and zone of influence labeled condition data that is selected from the set consisting of:
 a) ZOI_target-outer-distance-mean-standard-deviation,
 b) ZOI_target-outer-distance-standard-deviation_mean,
 c) ZOI_target-outer-distance-standard-deviation_sd,
 d) ZOI_normalized-target-outer-distance-mean-standard-deviation,
 e) ZOI_normalized-target-outer-distance-standard-deviation_mean, and
 f) ZOI_normalized-target-outer-distance-standard-deviation_sd.

22. The computerized automatic two image object set spatial mapping feature generation method of claim 5 wherein the spatial mapping features calculation includes the spatial mapping features associated with connected component labeled target data and no operation condition data that is selected from the set consisting of:
 a) Intersection-target-component-count,
 b) Intersection-target-component-count-ratio,
 c) Intersection-target-component-average-area,
 d) Intersection-target-component-sd-area,
 e) Intersection-target-component-average-area-ratio,
 f) Intersection-target-component-sd-area-ratio, and
 g) Intersection-target-component-area-entropy.

23. The computerized automatic two image object set spatial mapping feature generation method of claim 5 wherein the spatial mapping features calculation includes the spatial mapping features associated with connected component labeled target data and inner distance transformed condition data that is selected from the set consisting of:
 a) Condition-inner-distance-mean-standard-deviation,
 b) Condition-inner-distance-standard-deviation_mean,
 c) Condition-inner-distance-standard-deviation_sd,
 d) Normalized-condition-inner-distance-mean-standard-deviation,
 e) Normalized-condition-inner-distance-standard-deviation_mean, and
 f) Normalized-condition-inner-distance-standard-deviation_sd.

24. The computerized automatic two image object set spatial mapping feature generation method of claim 5 wherein the spatial mapping features calculation includes the spatial mapping features associated with connected component labeled target data and outer distance transformed condition data that is selected from the set consisting of:
 a) Condition-outer-distance-mean-standard-deviation,
 b) Condition-outer-distance-standard-deviation_mean,
 c) Condition-outer-distance-standard-deviation_sd,
 d) Normalized-condition-outer-distance-mean-standard-deviation,
 e) Normalized-condition-outer-distance-standard-deviation_mean, and
 f) Normalized-condition-outer-distance-standard-deviation_sd.

25. The computerized automatic two image object set spatial mapping feature generation method of claim 5 wherein the spatial mapping features calculation includes the spatial mapping features associated with connected component labeled target data and connected component labeled condition data that is selected from the set consisting of:
 a) Target_intersection-component-count_mean,
 b) Target_intersection-component-count_sd,
 c) Target_intersection-component-count-ratio_mean,
 d) Target_intersection-component-count-ratio_sd,
 e) Target_intersection-component-average-area_mean,
 f) Target_intersection-component-average-area_sd, g) Target_intersection-component-average-area-ratio_mean,
h) Target_intersection-component-average-area-ratio_sd,
i) Target_intersection-component-area-entropy_mean, and
j) Target_intersection-component-area-entropy_sd.

26. The computerized automatic two image object set spatial mapping feature generation method of claim 5 wherein the spatial mapping features calculation includes the spatial mapping features associated with connected component labeled target data and zone of influence labeled condition data that is selected from the set consisting of:
a) Target_intersection-ZOI-component-count_mean,
b) Target_intersection-ZOI-component-count_sd,
c) Target_intersection-ZOI-component-count-ratio_mean,
d) Target_intersection-ZOI-component-count-ratio_sd,
e) Target_intersection-ZOI-component-area_mean,
f) Target_intersection-ZOI-component-average-area_sd,
g) Target_intersection-ZOI-component-average-area-ratio_mean,
h) Target_intersection-ZOI-component-average-area-ratio_sd,
i) Target_intersection-ZOI-component-area-entropy_mean, and
j) Target_intersection-ZOI-component-area-entropy_sd.

27. The computerized automatic two image object set spatial mapping feature generation method of claim 5 wherein the spatial mapping features calculation includes the spatial mapping features associated with ZOI labeled target data and no operation condition data that is selected from the set consisting of:
a) Intersection-target-ZOI-component-count,
b) Intersection-target-ZOI-component-count-ratio,
c) Intersection-target-ZOI-component-average-area,
d) Intersection-target-ZOI-component-sd-area,
e) Intersection-target-ZOI-component-average-area-ratio,
f) Intersection-target-ZOI-component-sd-area-ratio, and
g) Intersection-target-ZOI-component-area-entropy.

28. The computerized automatic two image object set spatial mapping feature generation method of claim 5 wherein the spatial mapping features calculation includes the spatial mapping features associated with ZOI labeled target data and inner distance transformed condition data that is selected from the set consisting of:
a) Condition-inner-distance-mean-ZOI-standard-deviation,
b) Condition-inner-distance-standard-deviation-ZOI_mean,
c) Condition-inner-distance-standard-deviation-ZOI_sd,
d) Normalized-condition-inner-distance-mean-ZOI-standard-deviation,
e) Normalized-condition-inner-distance-standard-deviation-ZOI_mean, and
f) Normalized-condition-inner-distance-standard-deviation-ZOI_sd.

29. The computerized automatic two image object set spatial mapping feature generation method of claim 5 wherein the spatial mapping features calculation includes the spatial mapping features associated with ZOI labeled target data and outer distance transformed condition data that is selected from the set consisting of:
a) Condition-outer-distance-mean-ZOI-standard-deviation,
b) Condition-outer-distance-standard-deviation-ZOI_mean,
c) Condition-outer-distance-standard-deviation-ZOI_sd,
d) Normalized-condition-outer-distance-mean-ZOI-standard-deviation,
e) Normalized-condition-outer-distance-standard-deviation-ZOI_mean, and
f) Normalized-condition-outer-distance-standard-deviation-ZOI_sd.

30. The computerized automatic two image object set spatial mapping feature generation method of claim 5 wherein the spatial mapping features calculation includes the spatial mapping features associated with ZOI labeled target data and outer distance transformed condition data that is selected from the set consisting of:
a) Target-ZOI_intersection-component-count_mean,
b) Target-ZOI_intersection-component-count_sd,
c) Target-ZOI_intersection-component-count-ratio_mean,
d) Target-ZOI_intersection-component-count-ratio_sd,
e) Target-ZOI_intersection-component-area_mean,
f) Target-ZOI_intersection-component-average-area_sd,
g) Target-ZOI_intersection-component-average-area-ratio_mean,
h) Target-ZOI_intersection-component-average-area-ratio_sd,
i) Target-ZOI_intersection-component-area-entropy_mean, and
j) Target-ZOI_intersection-component-area-entropy_sd.

31. The computerized automatic two image object set spatial mapping feature generation method of claim 5 wherein the spatial mapping features calculation includes the spatial mapping features associated with ZOI labeled target data and ZOI labeled condition data that is selected from the set consisting of:
a) Target-ZOI_intersection-ZOI-component-count_mean,
b) Target-ZOI_intersection-ZOI-component-count_sd,
c) Target-ZOI_intersection-ZOI-component-count-ratio_mean,
d) Target-ZOI_intersection-ZOI-component-count-ratio_sd,
e) Target-ZOI_intersection-ZOI-component-area_mean,
f) Target-ZOI_intersection-ZOI-component-average-area_sd,
g) Target-ZOI_intersection-ZOI-component-average-area-ratio_mean,
h) Target-ZOI_intersection-ZOI-component-average-area-ratio_sd,
i) Target-ZOI_intersection-ZOI-component-area-entropy_mean, and
j) Target-ZOI_intersection-ZOI-component-area-entropy_sd.

32. A computerized automatic multiple image object set spatial mapping feature generation method to create spatial mapping features that can be used to characterize subtle physical, structural or geometrical conditions comprising the steps of:
a) Inputting a first image object set containing its associated image pixels, designated as target image object set;
b) Inputting a plurality of additional image object sets, each object contains its associated image pixels;
c) Designating each of the plurality of additional image object sets as condition image object set;

d) Calculating spatial mapping features for the target image object set from transformed images of the target image object set and the condition image object set;
e) Performing contrast feature extraction using spatial mapping features for each dual of the object set pairs to create a contrast features output;
f) Using the contrast features output to characterize spatial relations of multiple sets of objects for applications such as geographical information systems, cell image informatics, semiconductor or electronic automatic defect classification or military automatic target classification applications.

33. The computerized automatic multiple image object set spatial mapping feature generation method of claim 32 wherein the contrast feature is selected from the set consisting of:
 a) Feature difference,
 b) Absolute feature difference,
 c) First feature proportion,
 d) Second feature proportion, and
 e) Absolute difference proportion.

\* \* \* \* \*